US012121822B2

(12) United States Patent
Wang et al.

(10) Patent No.: US 12,121,822 B2
(45) Date of Patent: Oct. 22, 2024

(54) METHOD, APPARATUS, AND TERMINAL FOR TRANSMITTING MESSAGE IN MULTIPLAYER ONLINE BATTLE PROGRAM, AND MEDIUM

(71) Applicant: Tencent Technology (Shenzhen) Company Limited, Shenzhen (CN)

(72) Inventors: Pengsen Wang, Shenzhen (CN); Jiaxun He, Shenzhen (CN); Zhiming Liang, Shenzhen (CN); Banghua Yang, Shenzhen (CN); Xinyue Liao, Shenzhen (CN); Xin Chen, Shenzhen (CN); Yuntao Peng, Shenzhen (CN); Jiajie Chen, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 259 days.

(21) Appl. No.: 17/840,477

(22) Filed: Jun. 14, 2022

(65) Prior Publication Data
US 2023/0020032 A1 Jan. 19, 2023

Related U.S. Application Data

(63) Continuation of application No. PCT/CN2021/124232, filed on Oct. 15, 2021.

(30) Foreign Application Priority Data

May 20, 2021 (CN) .......................... 202110553181.0

(51) Int. Cl.
*A63F 13/87* (2014.01)
*A63F 13/335* (2014.01)
(Continued)

(52) U.S. Cl.
CPC ............ *A63F 13/87* (2014.09); *A63F 13/335* (2014.09); *A63F 13/537* (2014.09);
(Continued)

(58) Field of Classification Search
None
See application file for complete search history.

(56) References Cited

U.S. PATENT DOCUMENTS 9,295,919 B2 * 3/2016 Maynard ................. A63F 13/87
10,918,939 B2 2/2021 Perlman et al.
(Continued)

FOREIGN PATENT DOCUMENTS

CN     107596691 A     1/2018
CN     110368691 A     10/2019
(Continued)

OTHER PUBLICATIONS

Tencent Technology, WO, PCT/CN2021/124232, Feb. 15, 2022, 4 pgs.
(Continued)

*Primary Examiner* — Seng H Lim
(74) *Attorney, Agent, or Firm* — Morgan, Lewis & Bockius LLP

(57) ABSTRACT

A method, apparatus, and terminal for transmitting a message in a multiplayer game, and a medium are provided, belonging to the field of human-machine interaction. The method includes: displaying a first user interface of the multiplayer game, the multiplayer game providing a virtual environment for at least two teams of virtual characters to conduct an online battle; displaying a warning transmitting control in a predetermined region on the first user interface in response to that an event associated with a virtual character in the virtual environment satisfies a warning condition, the warning transmitting control being configured to
(Continued)

transmit a warning message corresponding to the event; and transmitting the warning message to a second terminal in response to a transmitting operation on the warning message, the first account and the second account having a teammate relationship.

19 Claims, 14 Drawing Sheets

(51) Int. Cl.
  *A63F 13/537* (2014.01)
  *A63F 13/847* (2014.01)
(52) U.S. Cl.
  CPC ...... *A63F 13/847* (2014.09); *A63F 2300/407* (2013.01); *A63F 2300/572* (2013.01)

(56) References Cited

U.S. PATENT DOCUMENTS

| | | | | |
|---|---|---|---|---|
| 2003/0046401 | A1 | 3/2003 | Abbott et al. | |
| 2010/0287011 | A1* | 11/2010 | Muchkaev | A63F 13/792 |
| | | | | 706/45 |
| 2012/0157212 | A1* | 6/2012 | Kane | G06F 3/0482 |
| | | | | 463/42 |
| 2014/0128155 | A1* | 5/2014 | Morioka | A63F 13/533 |
| | | | | 463/29 |
| 2016/0036734 | A1* | 2/2016 | Ruth | H04L 51/10 |
| | | | | 709/206 |
| 2016/0170589 | A1* | 6/2016 | Maynard | A63F 13/533 |
| | | | | 463/31 |
| 2018/0350144 | A1 | 12/2018 | Rathod | |
| 2018/0351895 | A1* | 12/2018 | Rathod | A63F 13/31 |
| 2021/0031106 | A1 | 2/2021 | Alderman et al. | |
| 2021/0331070 | A1 | 10/2021 | Song | |
| 2021/0394049 | A1* | 12/2021 | Matsuura | A63F 13/87 |
| 2024/0139635 | A1* | 5/2024 | Rudi | A63F 13/67 |

FOREIGN PATENT DOCUMENTS

| | | |
|---|---|---|
| CN | 110433493 A | 11/2019 |
| CN | 112774190 A | 5/2021 |
| CN | 113117331 A | 7/2021 |
| JP | 2001239059 A | 9/2001 |
| JP | 2011055981 A | 3/2011 |
| WO | WO 2017112520 A1 | 6/2017 |

OTHER PUBLICATIONS

Tencent Technology, IPRP, PCT/CN2021/124232, Nov. 21, 2023, 5 pgs.

Tencent Technology, ISR, PCT/CN2021/124232, Feb. 15, 2022, 2 pgs.

52pk, "How to Use Likes in the King of Glory", 52pk.com, Jun. 1, 2020, 4 pgs., Retrieved from the Internet: https://www.52pk.com/gl/6413.html.

Tencent Technology, Korean Office Action, KR Patent Application No. 10-2022-7027389, Jun. 4, 2024, 15 pgs.

* cited by examiner

| Warning information | Specific warning condition | Display occasion of warning transmitting control | Presentation form of warning transmitting control | Presentation form of warning message |
|---|---|---|---|---|
| Enemy virtual character located in a same branch during battling disappears | Within the first 4 minutes of a game, an enemy virtual character located in a same branch disappears from the field of view of an ally for more than 3 seconds | Moment at which a disappearance time of an enemy virtual character in the field of view of an ally within the first 4 minutes of a game reaches 3 seconds | ? | ? Enemy disappears |
| First enemy virtual character reaches a level 4 | It is discovered that the first enemy virtual character reaches a level 4, and a first virtual character nearest to the enemy virtual character that reaches the level 4 (in a case that a plurality of enemy virtual characters simultaneously reach the level 4, an avatar of an enemy virtual character nearest to an ally is presented in a warning message) | Moment of discovery |  | Reach level 4 |
| Enemy virtual character invades an ally jungle | An appearance time of an enemy virtual character in an ally jungle exceeds 3 seconds, and a first virtual character nearest to the enemy virtual character | Moment at which an appearance time of an enemy virtual character in an ally jungle reaches 3 seconds |  | Enemy invades jungle |

FIG. 9A

| Warning information | Specific warning condition | Display occasion of warning transmitting control | Presentation form of warning transmitting control | Presentation form of warning message |
|---|---|---|---|---|
| Enemy virtual character casts a summoner skill (including Blink, Weak, Cleanse, Stun, Heal, Sprint, Rage, End, Smite, or Interference) | An enemy virtual character is in the field of view of an ally, the enemy virtual character casts a summoner skill, there is a friend virtual character within a range of 2000 mm when the enemy virtual character casts the summoner skill (if a plurality of enemy virtual characters cast summoner skills within an extremely short time, and there is a friend virtual character within ranges of 2000 mm when the enemy virtual characters cast the summoner skills, a summoner skill that occurs last in a time axis is displayed in a warning message), and a first virtual character is a virtual character nearest to the enemy virtual character casting the summoner skill | Moment at which an enemy virtual character casts a summoner skill | | No Stun |
| | | | | No Heal |
| | | | | No Sprint |
| | | | | No Rage |
| | | | | No Execute |
| | | | | No Retribution |
| | | | | No Interference |

FIG. 9B

| Warning information | Specific warning condition | Display occasion of warning transmitting control | Presentation form of warning transmitting control | Presentation form of warning message |
|---|---|---|---|---|
| Enemy virtual character casts Ultimate Move | An enemy virtual character is in the field of view of an ally, there is a friend virtual character within a range of 2000 mm when the enemy virtual character casts Ultimate Move (if a plurality of enemy virtual characters cast Ultimate Move within an extremely short time, and there is a friend virtual character within ranges of 2000 mm when the enemy virtual characters cast Ultimate Move, Ultimate Move that occurs last in a time axis is displayed in a warning message), and a first virtual character is a virtual character nearest to the enemy virtual character casting Ultimate Move | Moment at which an enemy virtual character casts Ultimate Move |  | 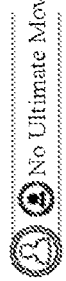 No Ultimate Move |
| First virtual character is in a poor state | Hit points of a first virtual character are lower than 10% or a combat power thereof is lower than 10% | Moment at which hit points of a first virtual character are lower than 10% or a combat power thereof is lower than 10% |  | 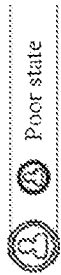 Poor state |
| Enemy virtual character disappears in middle and late stages | After the first 10 minutes of a game, a time during which all enemy virtual characters disappear from the field of view of an ally exceeds 10 seconds, and a first virtual character is a friend virtual character with the highest economic value | Moment at which disappearance times of all enemy virtual characters in the field of view of an ally after the first 10 minutes of a game reach 10 seconds |  | 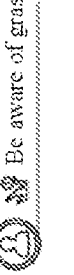 Be aware of grass |
| Prompt teammates that someone is at a location of grass | A first virtual character hits, by casting a skill, an enemy hidden in grass | Moment at which a first virtual character hits, by casting a skill, an enemy hidden in grass |  | 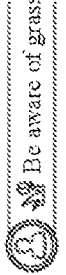 Be aware of grass |

FIG. 9C

METHOD, APPARATUS, AND TERMINAL FOR TRANSMITTING MESSAGE IN MULTIPLAYER ONLINE BATTLE PROGRAM, AND MEDIUM

CROSS-REFERENCE TO RELATED APPLICATIONS

This application is a continuation application of PCT Patent Application No. PCT/CN2021/124232, entitled "MESSAGE SENDING METHODS, DEVICES, TERMINALS AND MEDIA IN MULTIPLAYER ONLINE BATTLE PROGRAMS" filed on Oct. 15, 2021, which claims priority to Chinese Patent Application No. 202110553181.0, filed with the State Intellectual Property Office of the People's Republic of China on May 20, 2021, and entitled "METHOD, APPARATUS, AND TERMINAL FOR TRANSMITTING MESSAGE IN MULTIPLAYER ONLINE BATTLE PROGRAM, AND MEDIUM", all of which are incorporated herein by reference in their entirety.

FIELD OF THE TECHNOLOGY

This application relates to the field of man-machine interaction, and in particular, to a method, apparatus, and terminal for transmitting a message in a multiplayer online battle program, and a medium.

BACKGROUND OF THE DISCLOSURE

Multiplayer online battle arena (MOBA) is a quite popular game form. In such a game form, users are required to purchase equipment, the users are assigned to two teams, and the two teams compete with each other in scattered game maps. Each user controls a selected virtual character by using an interface in a real-time strategy (RTS) style, and the user only needs to control the virtual character selected by the user.

In the related art, the MOBA game includes a message transmitting function for communication between different users. A message control for chat is displayed on a user interface. A user enters a chat interface by clicking/tapping the message control, and then, after entering text using a virtual keyboard or a physical keyboard, clicks/taps a send key to send the message.

However, the game rhythm of the MOBA game is relatively fast, manually tapping a virtual keyboard or physical keyboard to enter text involves many operation steps, resulting in low communication efficiency, and entering text may affect game operations in the game.

SUMMARY

An embodiment of this application provides a message transmitting method and apparatus for transmitting a message in a multiplayer online battle program, a terminal, and a medium, to improve the efficiency of transmitting a message in a multiplayer online battle program and improve the efficiency of human-machine interaction. The technical solutions are as follows:

According to an aspect of this application, a method for transmitting a message in a multiplayer online battle program is performed by a first terminal, the first terminal logging into the multiplayer online battle program using a first account, and the method including:

displaying a first user interface of the multiplayer online battle program, the multiplayer online battle program providing a virtual environment for at least two teams of virtual characters to conduct an online battle;

displaying a warning transmitting control in a predetermined region on the first user interface in response to that an event associated with a virtual character in the virtual environment satisfies a warning condition, the warning transmitting control being configured to transmit a warning message corresponding to the event; and transmitting the warning message to a second terminal in response to a transmitting operation triggered on the warning transmitting control, the second terminal logging into the multiplayer online battle program using a second account, and the first account and the second account having a teammate relationship.

According to another aspect of this application, a terminal is provided, including a processor and a memory, the memory storing at least one instruction, at least one program, a code set, or an instruction set, and the at least one instruction, the at least one program, the code set, or the instruction set being loaded and executed by the processor to implement the method for transmitting a message in a multiplayer online battle program as stated above or the method for receiving a message in a multiplayer online battle program as stated above.

According to another aspect of this application, a non-transitory computer-readable storage medium is provided, storing at least one instruction, at least one program, a code set, or an instruction set, the at least one instruction, the at least one program, the code set, or the instruction set being loaded and executed by a processor to implement the method for transmitting or receiving a message in a multiplayer online battle program as stated above.

The technical solutions provided in the embodiments of this application include at least the following beneficial effects:

When a virtual character generates an event satisfying a warning condition, a warning transmitting control corresponding to the event is automatically generated on a first user interface, a user can transmit a warning message related to an enemy virtual character or a virtual character controlled by the user by only performing a selection operation on the warning transmitting control, so that a friend can quickly learn of warning information. An efficient method for transmitting a message in a multiplayer online battle program is provided, thereby saving the time spent by the user in performing click/tap operations and typing operations many times and improving the efficiency of human-machine interaction.

BRIEF DESCRIPTION OF THE DRAWINGS

FIGS. 9A through 9C show correspondences between warning information, a specific warning condition, a display occasion of a warning transmitting control, a presentation form of the warning transmitting control, and a presentation form of a warning message in a method for transmitting a message in a multiplayer online battle program according to an embodiment of this application.

DESCRIPTION OF EMBODIMENTS

Figure 1:
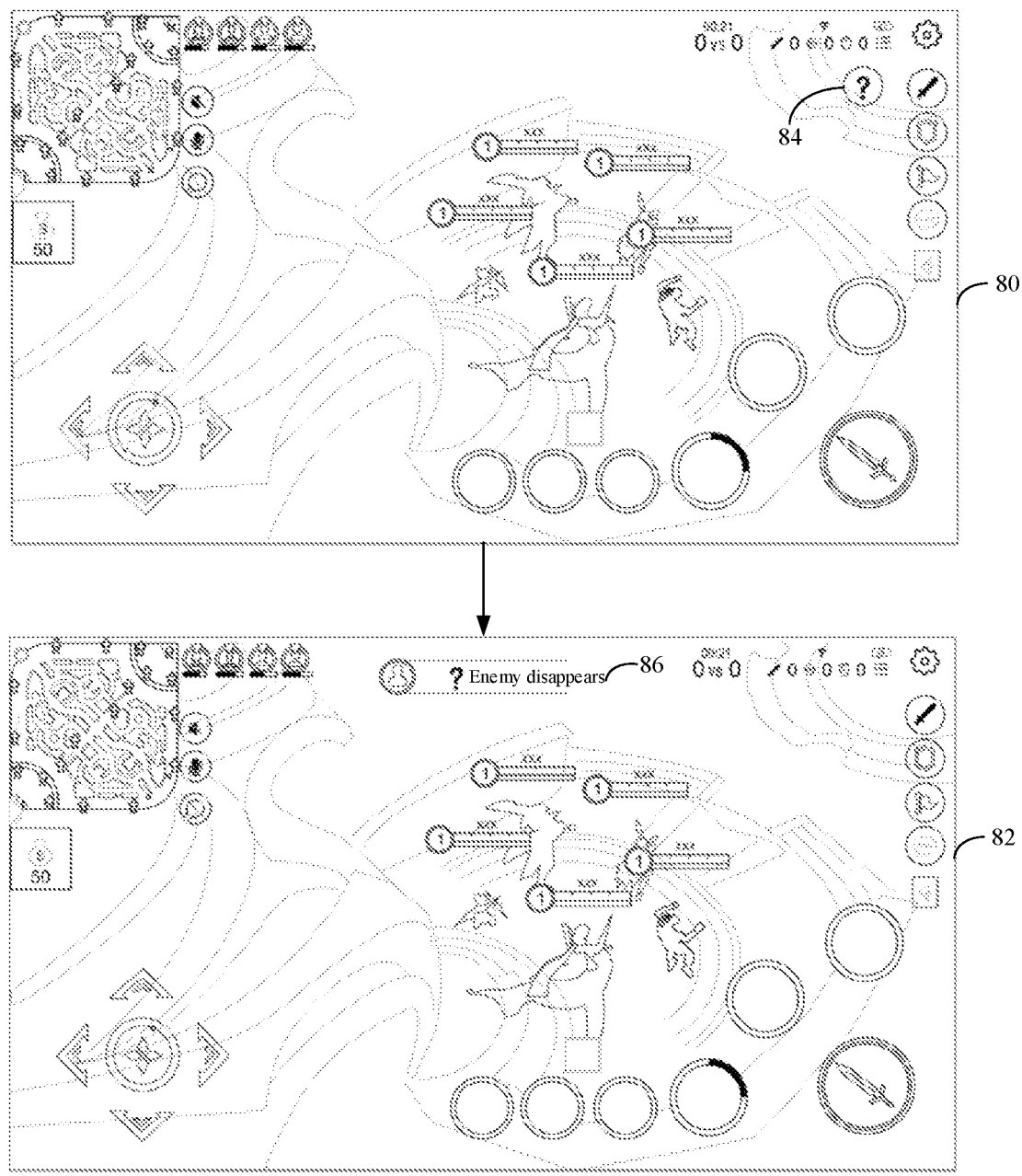
FIG. 1 is a schematic diagram of an interface of a method for transmitting a message in a multiplayer online battle program according to an embodiment of this application.

First, several terms included in this application are described.

Virtual environment: a virtual environment displayed (or provided) by an application when run on a terminal. The virtual environment may be a simulated environment of a real world, or may be a semi-simulated semi-fictional three-dimensional (3D) environment, or may be an entirely fictional 3D environment. The virtual environment may be any one of a two-dimensional virtual environment, a 2.5-dimensional virtual environment, or a three-dimensional virtual environment. In some embodiments, the virtual environment is further used for a virtual environment battle between at least two virtual characters, and there are virtual resources available to the at least two virtual characters in the virtual environment. In some embodiments, the virtual environment includes a square map. The square map includes a lower left corner region and an upper right corner region that are symmetrical. Virtual characters on two opposing camps occupy the regions respectively, and the objective of each side is to destroy a target building deep in the opponent's region to win victory.

Virtual character (also referred to as hero) refers to a movable object in the virtual environment. The movable object may be at least one of a virtual person, a virtual animal, or a cartoon figure. In some embodiments, when a virtual world is a three-dimensional virtual world, the virtual characters may be three-dimensional models. Each virtual character has a shape and a volume in the three-dimensional virtual world, and occupies some space in the three-dimensional virtual world. In some embodiments, the virtual character is a three-dimensional character constructed based on three-dimensional human skeleton technology. The virtual character wears different skins to implement different appearances. In some implementations, the virtual character may be alternatively implemented by using a 2.5-dimensional model or a two-dimensional model. This is not limited in the embodiments of this application. In some embodiments of this application, the virtual characters are virtual characters that can be controlled by users in the virtual environment, and virtual characters (such as creeps, monsters, and non-player characters (NPCs)) that cannot be controlled by the users may be referred to as assisting virtual characters.

MOBA refers to an arena in which different virtual teams on at least two opposing camps occupy respective map regions in a map provided by a virtual environment, and compete against each other using a specific victory condition as a goal. The victory condition includes, but is not limited to, at least one of occupying a fort or destroying a fort of the opposing side, killing virtual characters on the opposing side, ensuring own survival in a specified scene and time, seizing a specific resource, or outscoring the opponent within a specified time. The battle arena game may take place in rounds. The same map or different maps may be used in different rounds of the battle arena game. Each virtual team includes one or more virtual characters, for example, 1 virtual character, 3 virtual characters, or 5 virtual characters.

MOBA game is a game in which several forts are provided in a virtual world, and users on different camps control virtual characters to battle in the virtual world, occupy forts or destroy forts of the opposing camp. For example, in the MOBA game, the users may be divided into two opposing camps. The virtual characters controlled by the users are scattered in the virtual world to compete against each other, and the victory condition is to destroy or occupy all enemy forts. The MOBA game takes place in rounds. A duration of a round of the MOBA game is from a time point at which the game starts to a time point at which the victory condition is met. It is noted that the present application is not limited to MOBA game. Instead, it applies to many different types of multiplayer games.

Virtual environment screen: a screen obtained by observing a 3D virtual environment from a third-person top-down perspective. In some embodiments, a top-down perspective is a 45-degree angle. A virtual camera is usually set in a game scene, and game scene content captured by the virtual camera is a virtual environment screen presented by a user interface. In a 3D game with a third-person perspective, the virtual camera may capture game scene content including a virtual character, and display the virtual character on a virtual environment screen. In another example, in some games without a virtual character, the movement and rotation of the virtual camera may alternatively be directly controlled to update a game screen presented by the user interface.

Skill: A character capability possessed by a virtual character in a 3D virtual environment, which can produce an effect on a virtual character of another camp. This skill can be an offensive skill, a defensive skill, a skill with a specific target, a group attack skill, a skill that produces a Launch Attack effect on the virtual character of the another camp, or a skill that produces a deceleration effect on the virtual character of the another camp, which is not limited in this application.

Summoner skill: a skill that can be acquired by all virtual characters, for example, Sprint, Heal, or Blink. The higher the level of a game account, the more summoner skills available to the virtual character in the game.

Hero skill: Different from the summoner skill that can be obtained by all virtual characters, hero skills are unique skills for different virtual characters.

Ultimate Move: Ultimate Move is one of the hero skills corresponding to each virtual character. Usually, Ultimate Move is a skill with the largest output damage in various hero skills corresponding to the virtual character or is a skill with the longest cooldown time.

Field of view: information, including building information, virtual character information, or the like, in a virtual environment screen obtained by a virtual character. In a typical MOBA game, the entire team shares a field of view. That is, when a virtual character A sees an enemy virtual character B, the entire team of the virtual character A can see the enemy virtual character B. The terrain does not obscure the field of view, but when the virtual character enters a specific region such as grass, the field of view is obscured.

In a typical MOBA game, an intra-game communication system between different users can be completed by a built-in voice system of the system, that is, a voice call channel is formed between a plurality of users, and the users need to start microphones to speak. Alternatively, intra-game communication is completed by using a chat typing system. A text chatting channel is formed between a plurality of users, and the users need to type on terminals for communication.

Many MOBA games are mobile phone games (mobile games for short). When running a MOBA game by using a mobile phone, a user may be in a place inappropriate to speak, such as a bedroom, a classroom, a carriage. In addition, there are cases that some users are unwilling to have a voice call with strangers. Therefore, the voice communication channel not only fails to provide effective communication, but also may cause network freezing. However, for mobile phones, typing on a touchscreen on which an interface of a MOBA game has been run not only may delay combat operations in the game, but may cause low efficiency of human-computer interaction due to a large quantity of steps.

The embodiments of this application provide a method for transmitting a message in a multiplayer online battle program, a warning transmitting control is displayed on a user interface when a warning condition is triggered, and a user may quickly transmit a message by clicking/tapping the warning transmitting control, so that the user completes the transmitting of warning information with the lowest human-computer interaction operation costs without starting a voice call or typing, thereby providing an efficient manner for transmitting a message in a multiplayer online battle program, and improving the efficiency of human-computer interaction.

FIG. 1 is a diagram of an interface of a method for transmitting a message in a multiplayer online battle program according to an exemplary embodiment of this application.

Exemplarily, a virtual character A controlled by a first account and an enemy virtual character B are located in a same branch. A first time threshold for a disappearance time of an enemy virtual character within the first 4 minutes of a game in a warning condition is preset to 3 seconds. Within the first 4 minutes of the game, if the virtual character B appears in the field of view of the virtual character A, and then disappears from the field of view of the virtual character A, and a disappearance time reaches 3 seconds, the warning condition is triggered, and a warning transmitting control 84 is displayed on a user interface 80 of the first account. As shown in the figure, the warning transmitting control 84 is in a shape of a question mark, and an icon in a shape of a question mark is used to indicate a warning message representing that the enemy disappears. By clicking/tapping the warning transmitting control 84, the first account transmits a warning message indicating that the enemy disappears to a friend account.

After the warning message is transmitted, the warning message is displayed on the user interface of the first account that controls the virtual character A and a user interface of a second account. As indicated by the warning message 86 displayed on a user interface 82, the content of the warning message includes: an avatar of an account that transmits the warning message (that is, an avatar of the first account), an icon of a type to which a warning condition belongs (that is, the question mark icon), and a text corresponding to the warning condition (that is, "Enemy disappears").

Figure 2:
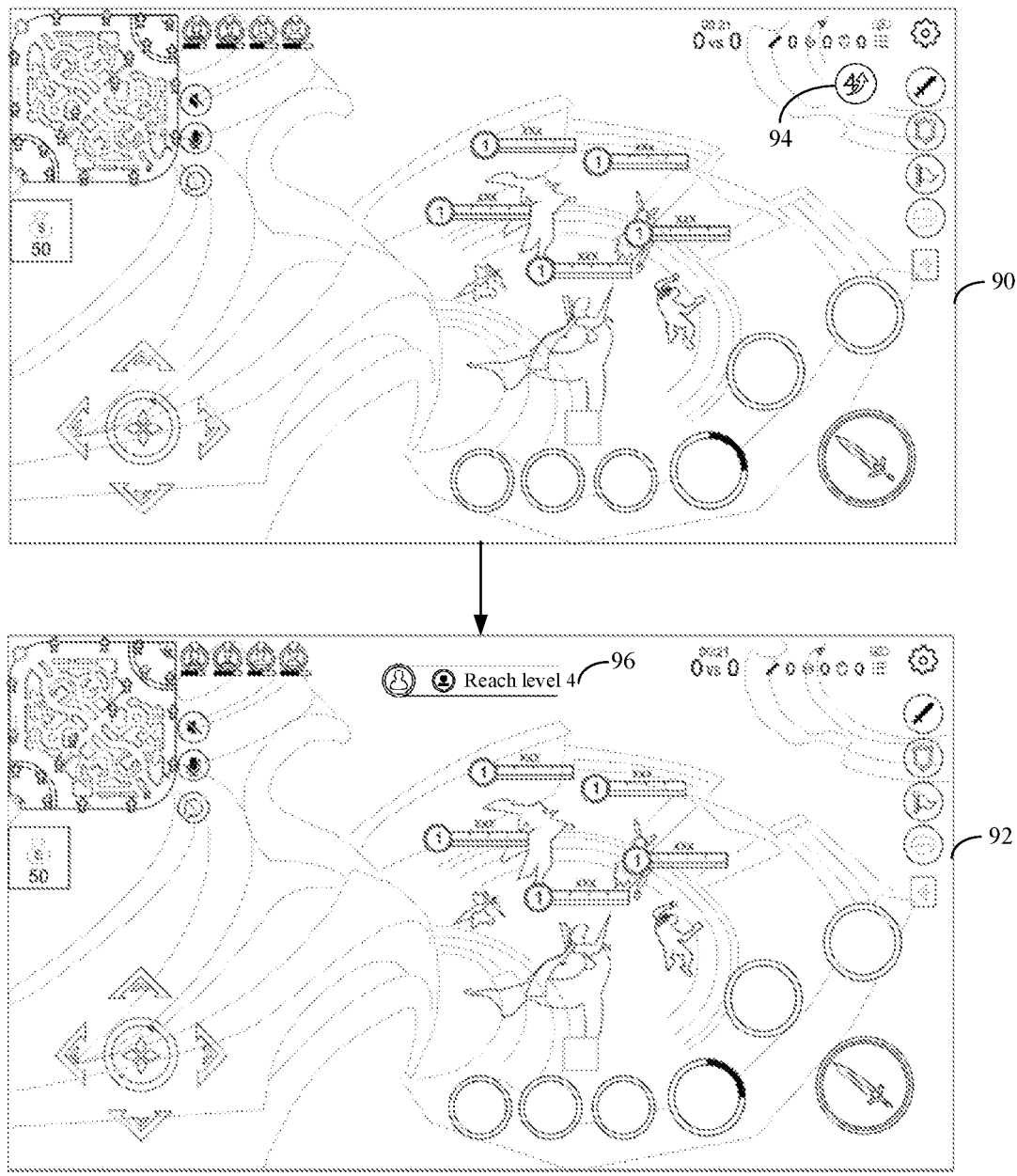
FIG. 2 is a schematic diagram of an interface of a method for transmitting a message in a multiplayer online battle program according to another embodiment of this application.

FIG. 2 is a diagram of an interface of a method for transmitting a message in a multiplayer online battle program according to another exemplary embodiment of this application.

Exemplarily, a virtual character A (or a friend virtual character of A) controlled by a first account finds for the first time that an enemy virtual character B reaches a level 4, and A is a virtual character closest to the enemy virtual character B in the current team. Because a warning condition is triggered at a moment at which the virtual character A finds the enemy virtual character B, a warning transmitting control 94 is displayed on a user interface 90 of the first account. As shown in the figure, the warning transmitting control 94 is an icon of a combination of a number 4 and an upward arrow. The icon is used for indicating a warning message that it is found that the first enemy virtual character reaches the level 4. By clicking/tapping the warning transmitting control 94, the first account transmits, to an account controlling a virtual character on the side of A, a warning message indicating that it is found that the first enemy virtual character reaches the level 4.

After the warning message is transmitted, the warning message is displayed on the user interface of the first account and a user interface of a second account. The second account is used for controlling a virtual character on the right of the virtual character A. As indicated by the warning message 96 displayed on a user interface 92, the content of the warning message includes: an avatar of an account that transmits the warning message (that is, an avatar of the first account), an icon of a type to which a warning condition belongs (that is, an icon of a combination of a number 4 and an upward arrow), and a text corresponding to the warning condition (that is, "Reach level 4").

Figure 3:
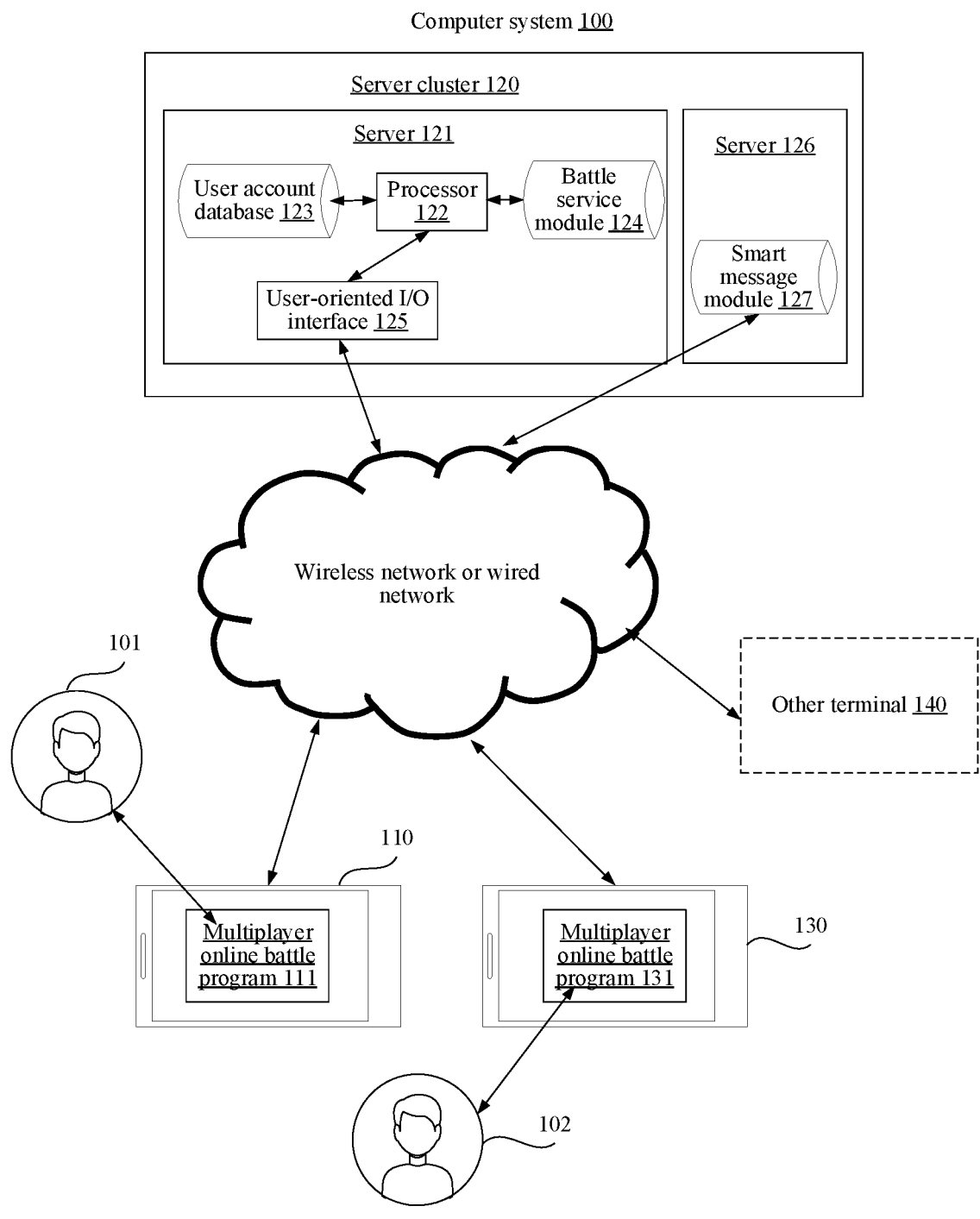
FIG. 3 is a structural block diagram of a computer system according to an embodiment of this application.

FIG. 3 is a structural block diagram of a computer system according to an exemplary embodiment of this application. The computer system 100 includes: a first terminal 110, a server cluster 120, and a second terminal 130.

A client 111 supporting a virtual environment is installed and run on the first terminal 110, and the client 111 may be a multiplayer online battle program. When the first terminal runs the client 111, a UI of the client 111 is displayed on a screen of the first terminal 110. The client may be any one of a military simulation program, a MOBA game, an escape shooting game, or a simulation game (SLG). In this embodiment, an example in which a client is a MOBA game is used for description. The first terminal 110 is a terminal used by a first user 101. The first user 101 uses the first terminal 110 to control a first virtual character located in the virtual environment to perform activities, and the first virtual character may be referred to as a master virtual character of the first user 101. The activities of the first virtual character include, but are not limited to: at least one of adjusting body postures, crawling, walking, running, riding, flying, jumping, driving, picking, shooting, attacking, or throwing. For example, the first virtual character is a first virtual person, for example, a simulated person character or a cartoon person character.

A client 131 supporting a virtual environment is installed and run on the second terminal 130, and the client 131 may be a multiplayer online battle program. When the second terminal 130 runs the client 131, a UI of the client 131 is displayed on a screen of the second terminal 130. The client may be any one of a military simulation program, a MOBA game, an escape shooting game, or an SLG game. In this embodiment, an example in which a client is a MOBA game is used for description. The second terminal 130 is a terminal used by a second user 102. The second user 102 uses the second terminal 130 to control a second virtual character located in the virtual environment to perform activities, and the second virtual character may be referred to as a master virtual character of the second user 102. Schematically, the second virtual character is a second virtual person, for example, a simulated person character or a cartoon person character.

In some embodiments, the first virtual person and the second virtual person are located in the same virtual environment. In some embodiments, the first virtual character and the second virtual character may belong to the same camp, the same team, or the same organization, have a friend relationship, or have a temporary communication permission. In some embodiments, the first virtual person and the second virtual person may belong to different sides, different teams or different organizations or may be enemies of each other.

In some embodiments, the client installed on the first terminal 110 is the same as the client installed on the second terminal 130, or the clients installed on the two terminals are the same type of clients of different operating system platforms (Android system or iOS system). The first terminal 110 may generally refer to one of a plurality of terminals, and the second terminal 130 may generally refer to another one of a plurality of terminals. In this embodiment, only the first terminal 110 and the second terminal 130 are used as an example for description. The first terminal 110 and the second terminal 130 are of the same or different device types. The device type includes at least one of a smartphone, a tablet computer, an e-book reader, an MP3 player, an MP4 player, a laptop computer, or a desktop computer.

FIG. 3 shows only two terminals. However, a plurality of other terminals 140 may access the server cluster 120 in different embodiments. In some embodiments, one or more terminals 140 are terminals corresponding to a developer. A developing and editing platform for the client of a virtual environment is installed on the terminal 140. The developer may edit and update the client on the terminal 140 and transmit an updated client installation package to the server cluster 120 by using a wired or wireless network. The first terminal 110 and the second terminal 130 may download the client installation package from the server cluster 120 to update the client.

The first terminal 110, the second terminal 130, and the another terminal 140 are connected to the server cluster 120 by a wireless network or a wired network.

The server cluster 120 includes at least one of one server, a plurality of servers, a cloud computing platform, or a virtualization center. The server 120 is configured to provide a background service for a client supporting a virtual environment. In some embodiments, the server cluster 120 is responsible for primary computing work, and the terminal is responsible for secondary computing work; or the server cluster 120 is responsible for secondary computing work, and the terminal is responsible for primary computing work; or the server cluster 120 and the terminals (the first terminal 110 and the second terminal 130) perform collaborative computing by using a distributed computing architecture among each other.

In a schematic example, the server cluster 120 includes a server 121 and a server 126. The server 121 includes a processor 122, a user account database 123, a battle service module 124, and a user-oriented input/output (I/O) interface 125. The processor 122 is configured to load instructions stored in the server 123, and process data in the user account database 121 and the battle service module 124. The user account database 123 is configured to store data of user accounts used by the first terminal 110, the second terminal 130, and the another terminal 140, for example, avatars of the user accounts, nicknames of the user accounts, battle effectiveness indexes of the user accounts, and service zones of the user accounts. The battle service module 124 is configured to provide a plurality of battle rooms for the users to battle, for example, a 1V1 battle room, a 3V3 battle room, a 5V5 battle room, and the like. The user-oriented I/O interface 125 is configured to establish communication between the first terminal 110 and/or the second terminal 130 by using a wireless network or a wired network for data exchange. In some embodiments, a smart message module 127 is disposed in the server 126, and the smart message module 127 participates in implementing the method for transmitting a message in a multiplayer online battle program provided in the following embodiment.

Figure 4:
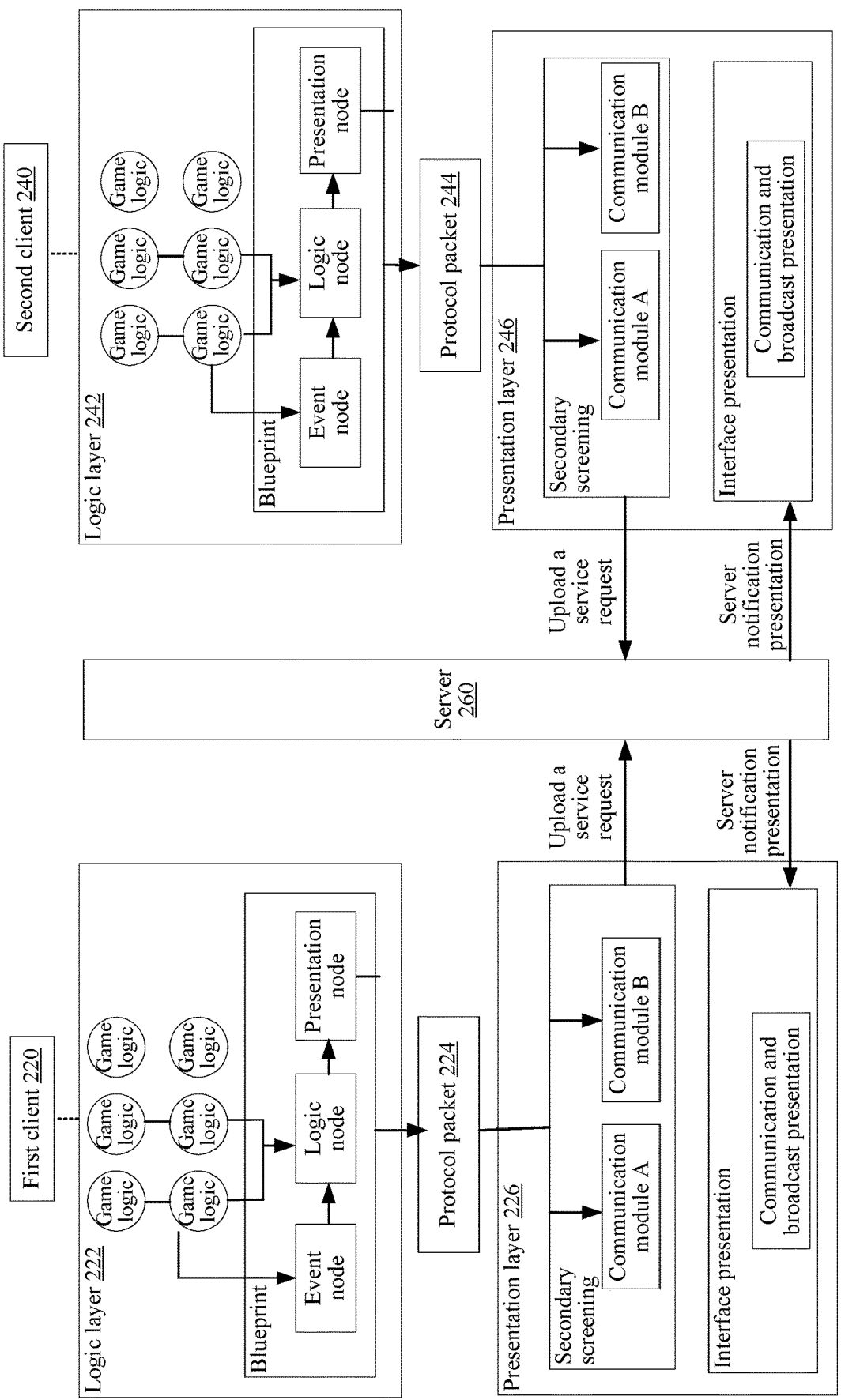
FIG. 4 is a schematic diagram of a multiplayer online battle system according to an embodiment of this application.

FIG. 4 is a schematic diagram of a multiplayer online battle system according to an exemplary embodiment of this application. Execution entities in the implementation architecture include: a first client 220, a second client 240, and a server 260.

The first client 220 and the second client 240 may be run on any terminal in FIG. 3. A client is divided into a logic layer and a presentation layer according to function. The logic layer 222 is configured to determine game logic and is written in C++. The presentation layer 226 is configured to implement a human-computer interaction function and implement a function of communication between a client and a server, and is written in C#.

Using the first client 220 as an example for description, the first client 220 may be divided into a logic layer 222 and a presentation layer 226. As can be seen from the figure, the logic layer 222 includes a variety of pieces of game logic that may be involved in the game. The game logic represents a mechanism or information in the game, for example, a mechanism that a virtual character casts a skill, a mechanism that a virtual character obtains a prop, time information of the game system, or the like.

A blueprint in the logic layer 222 provides an intuitive, node-based interface. A blueprint event execution flow is established in the blueprint. The blueprint event execution flow includes an event node, a logic node, and a presentation node. The event node is configured to monitor a game event in the game and serve as a trigger starting point of the blueprint event execution flow. The logic node is configured to determine game logic. The presentation node is configured to transmit a message to the presentation layer.

The presentation layer 226 is configured to implement a human-computer interaction function and implement a function of communication between a client and a server. A secondary screening module in the presentation layer 226 is configured to implement the human-computer interaction function with the user, and upload a service request determined after the human-computer interaction to the server. The interface presentation module in the presentation layer 226 is configured to perform communication and broadcast presentation on the user interface after a server notification presentation message sent by the server is received.

Exemplarily, using transmitting a warning message "No Ultimate Move" in a MOBA game as an example, a specific implementation process of the blueprint event execution flow and a cooperation process of the logic layer 222 and the presentation layer 226 are presented. After a game starts, the first account controls the first virtual character A on the first client 220 to play the game, and an event node in a blueprint of the first client 220 monitors events that occur in the game. When the event node detects occurrence of the event "The enemy virtual character B of the first virtual character A uses Ultimate Move". The event is one of the preset trigger events of the blueprint event execution flow. In this case, the blueprint event execution flow of the warning message "No Ultimate Move" is triggered. The logic node determines acquired game logic in the current game, and determines whether a condition of the warning message "No Ultimate Move" is satisfied. When the logic node determines that the game logic satisfies the condition of the warning message "No Ultimate Move", the presentation node sends a protocol packet 224 to the presentation layer. The protocol packet 224 is used for instructing the presentation layer to present the warning message "No Ultimate Move".

In some embodiments, the logic node determines whether a single piece of game logic satisfies a condition of a blueprint event. Alternatively, the logic node combines different game logic, and determines whether the combined game logic satisfies a condition of a blueprint event.

In some embodiments, the protocol package 224 may include a first account ID, a second account ID using the second client 240, a message ID used for indicating warning message content, a skill ID used by the enemy virtual character B, economic information of the first virtual character A, and so on.

In some embodiments, the protocol packet 224 is used for instructing the presentation layer to display the warning transmitting control on the user interface of the first client 220.

After receiving the protocol packet 224, the presentation layer 226 of the first client 220 obtains the warning message "No Ultimate Move" that needs to be presented and that is obtained by the logic layer 222 after the logical determining. The presentation layer 226 displays, on the user interface of the first client 220 through the communication module, the warning transmitting control used for indicating the warning message "No Ultimate Move", and after the warning transmitting control is triggered, uploads a service request to the server 260. The service request is used for transmitting a warning condition of "No Ultimate Move" to the second client. After receiving the service request uploaded from the first client 220, the server 260 transmits a server notification presentation message to the first client 220 and the second client 240. The server notification presentation message is used for instructing the first client 220 and the second client 240 to display the warning message "No Ultimate Move" on the user interfaces.

For a logic layer 242 and a presentation layer 246 of the second client 240, reference may be made to the descriptions of the logic layer 222 and the presentation layer 226 of the first client, and details are not described herein again.

Figure 5:
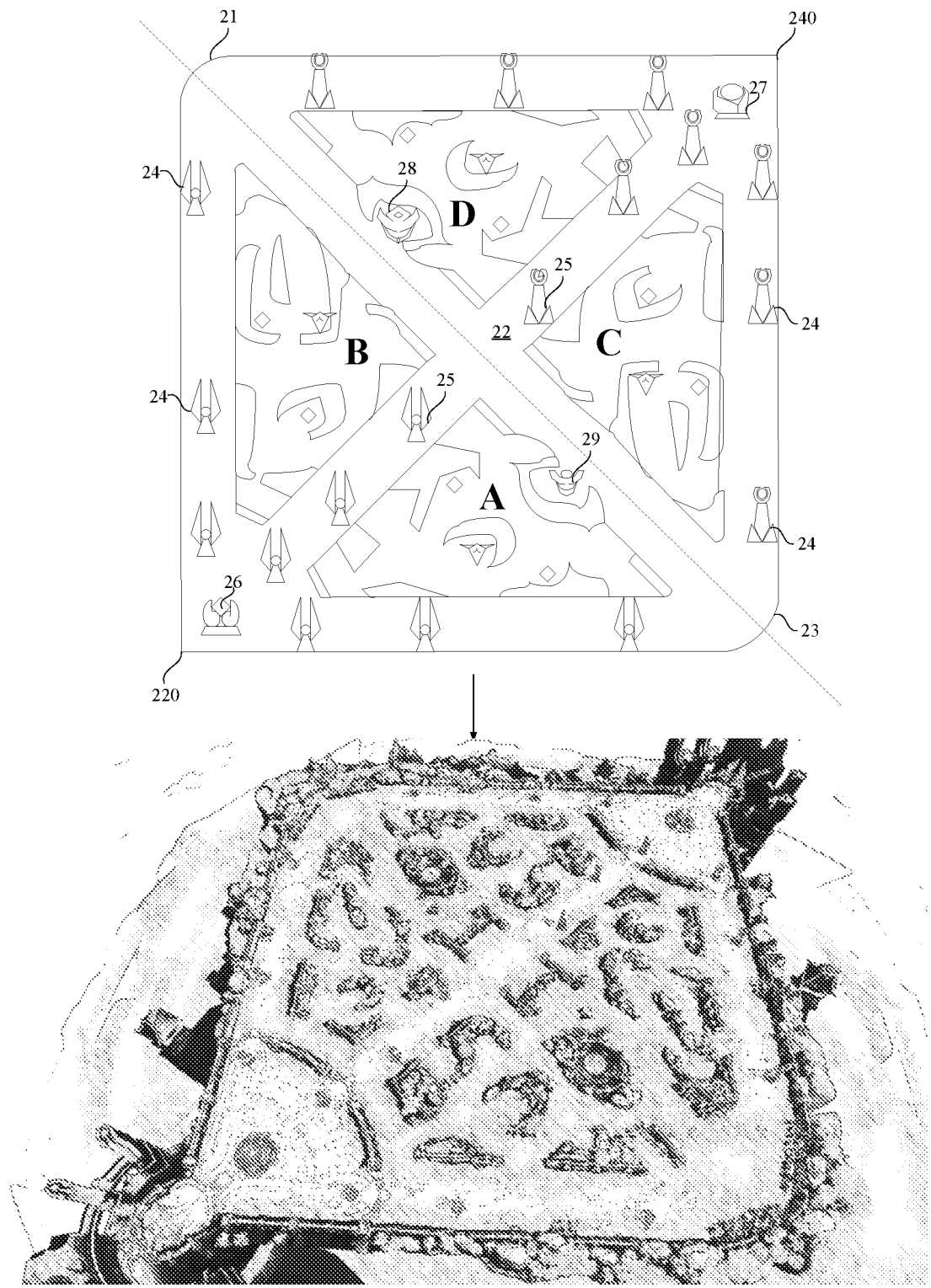
FIG. 5 is a schematic diagram of a map provided for a virtual environment of a MOBA game according to an embodiment of this application.

FIG. 5 is a schematic diagram of a map 200 provided for a virtual environment of a MOBA game according to an exemplary embodiment of this application. The map 200 is in a shape of a square. The map 200 is divided diagonally into a lower left triangle region 220 and an upper right triangle region 240. There are three lanes from a lower left corner of the lower left triangle region 220 to an upper right corner of the upper right triangle region 240: a top lane 21, a middle lane 22, and a bottom lane 23. In a typical battle, 10 virtual characters are required and divided into two camps to battle. 5 virtual characters in a first camp occupy the lower left triangle region 220, and 5 virtual characters in a second camp occupy the upper right triangle region 240. The first camp requires the destruction or occupation of all forts of the second camp as a victory condition, and the second camp requires the destruction or occupation of all forts of the first camp as a victory condition.

For example, the forts of the first camp include 9 turrets 24 and a first base 26. Among the 9 turrets 24, there are respectively 3 turrets on the top lane 21, the middle lane 22, and the bottom lane 23. The first base 26 is located at the lower left corner of the lower left triangle region 220.

For example, the forts of the second camp include 9 turrets 24 and a second base 27. Among the 9 turrets 24, there are respectively 3 turrets on the top lane 21, the middle lane 22, and the bottom lane 23. The second base 27 is located at the upper right corner of the upper right triangle region 240.

A location of a dotted line in FIG. 5 may be referred to as a riverway region. The riverway region is a common region of the first camp and the second camp, and is also a border region of the lower left triangle region 220 and the upper right triangle region 240.

The MOBA game requires the virtual characters to obtain resources in the map 200 to improve combat capabilities of the virtual characters. The resources include:

1. Creeps that periodically appear on the top lane 21, the middle lane 22, and the bottom lane 23, and when the creeps are killed, nearby virtual characters obtain experience values and gold coins.

2. The map may be divided into 4 triangle regions A, B, C, and D by using the middle lane (a diagonal line from the lower left corner to the upper right corner) and the riverway region (a diagonal line from an upper left corner to a lower right corner) as cutting lines. Monsters are periodically refreshed in the 4 triangle regions A, B, C, and D, and when the monsters are killed, nearby virtual characters obtain experience values, gold coins, and BUFF effects.

3. A big dragon 28 and a small dragon 29 are periodically refreshed in two symmetric positions in the riverway region. When the big dragon 28 and the small dragon 29 are killed, each virtual character in a killer camp obtains experience values, gold coins, and BUFF effects. The big dragon 28 may be referred to as a "dominator", a "Caesar", or another name, and the small dragon 29 may be referred to as a "tyrant", a "magic dragon", or another name.

In an example, the top lane and the bottom lane of the riverway each have a gold coin monster, which appears at the 30th second of the game. After the gold coin monsters are killed, nearby virtual characters obtain gold coins, and the gold coin monsters are refreshed after 70 seconds.

Region A: There is a red BUFF, two normal monsters (a pig and a bird), and a tyrant (a small dragon). The red BUFF and the monsters appear at the $30^{th}$ second of the game, the normal monsters are refreshed every 70 seconds upon being killed, and the red BUFF is refreshed every 90 seconds upon being killed.

The tyrant appears at the 2$^{nd}$ minute of the game, and is refreshed 3 minutes upon being killed. All teammates of the killer obtain gold coins and experience values after the tyrant is killed. The tyrant falls into darkness at the 9$^{th}$ minute and 55$^{th}$ second, and a dark tyrant appears at the 10$^{th}$ minute. A revenge BUFF of the tyrant is obtained by a virtual character who kills the dark tyrant.

Region B: There is a blue BUFF and two normal monsters (a wolf and a bird). The blue BUFF also appears at the 30$^{th}$ second and is refreshed every 90 seconds upon being killed.

Region C: The region C is the same as the region B, and there is a blue BUFF and two normal monsters (a wolf and a bird). Similarly, the blue BUFF also appears at the 30$^{th}$ second and is refreshed every 90 seconds upon being killed.

Region D: The region D is similar to the region A, and there is a red BUFF and two normal monsters (a pig and a bird). The red BUFF is also used for output increase and deceleration. There is also a dominator (a big dragon). The dominator appears at the 8$^{th}$ minute of the game and is refreshed 5 minutes upon being killed. A dominator BUFF, a fetter BUFF, and dominant pioneers (or sky dragons that are manually summoned) on the lanes may be obtained after the dominator is killed.

In an exemplary example, the BUFFs are explained in detail:

The red BUFF lasts for 70 seconds and carries continuous burning injuries and deceleration with an attack.

The blue BUFF lasts for 70 seconds and may shorten a cooldown (CD) and restore additional mana per second.

The dark tyrant BUFF and the fetter BUFF are obtained after the dark tyrant is killed.

The dark tyrant BUFF increases physical attacks (80+5% of a current attack) for the whole team and increase magic attacks (120+5% of a current magic attack) for the entire team for 90 seconds.

The fetter BUFF reduces an output for the dominator by 50%, and the fetter BUFF does not disappear when the virtual character is killed and lasts for 90 seconds.

The dominator BUFF and the fetter BUFF can be obtained by killing the dominator.

The dominator may improve life recover and mana recover for the whole team by 1.5% per second and last for 90 seconds. The dominator BUFF disappears when the virtual character is killed.

The fetter BUFF reduces an output for the dark tyrant by 50%, and the fetter BUFF does not disappear when the virtual character is killed and lasts for 90 seconds.

The following benefits may be obtained after the dominator is killed.

1. All the teammates obtain 100 gold coins, and regardless of whether a master virtual character has participated in fighting against the dominator or not, the master virtual character obtains the benefits, including a master virtual character that is in a resurrection CD.

2. From a moment at which the dominator is killed, next three waves (three lanes) of creeps of the killer party are replaced with the dominant pioneers (flying dragons). The dominant pioneers are very strong and attack in the three lanes at the same time, which brings a large creep line pressure on the opposing team. The opposing team needs to defense in three lanes. An alarm for the dominant pioneers is shown in the map, and during the alarm, there will be a hint of the quantity of waves of the coming dominant pioneers (usually three waves).

The combat capabilities of the 10 virtual characters include two parts: a level (also referred to as a character level or a hero level) and equipment. The level is obtained by using accumulated experience values, and the equipment is purchased by using accumulated gold coins. The 10 virtual characters may be obtained by matching 10 user accounts online by a server. For example, the server matches 2, 6, or 10 user accounts online for competition in the same virtual world. The 2, 6, or 10 virtual characters are on two opposing camps. Quantities of virtual characters corresponding to the two camps are the same. For example, there are 5 virtual characters on each camp. Types of the 5 virtual characters may be a warrior character, an assassin character, a mage character, a support (or meat shield) character, and an archer character respectively.

The battle may take place in rounds. The same map or different maps may be used in different rounds of battle. Each camp includes one or more virtual characters, for example, 1 virtual character, 3 virtual characters, or 5 virtual characters.

Figure 6:
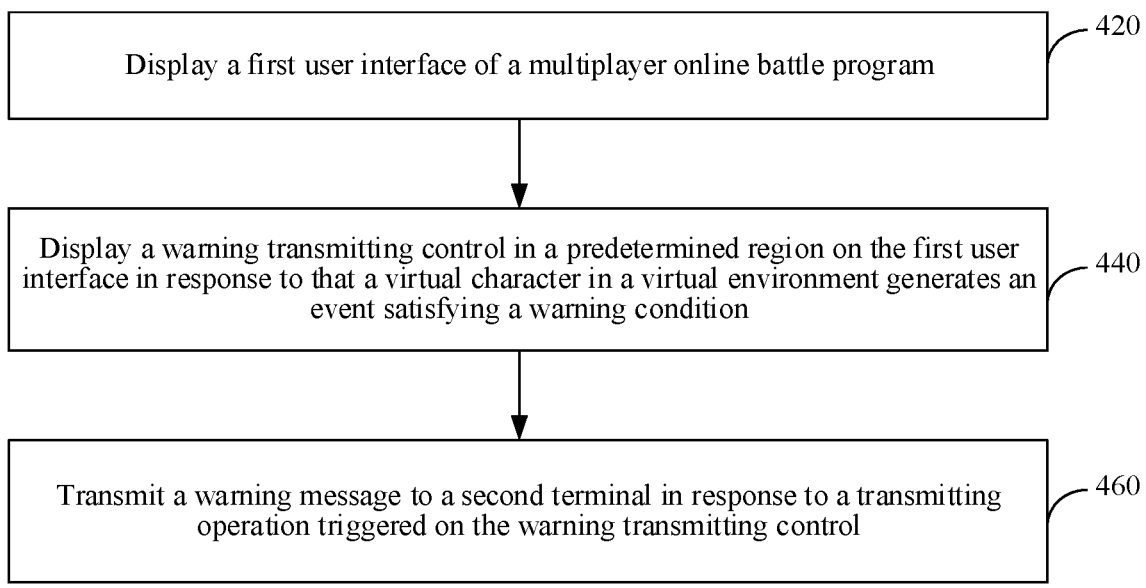
FIG. 6 is a flowchart of a method for transmitting a message in a multiplayer online battle program according to an embodiment of this application.

FIG. 6 is a flowchart of a method for transmitting a message in a multiplayer online battle program according to an exemplary embodiment of this application. The method may be performed by any terminal in FIG. 3, for example, be performed by the first terminal. The first terminal logs into a multiplayer online battle program (that is, the first client) using the first account. The method includes:

Step 420: Display a first user interface of a multiplayer online battle program.

The first user interface is a user interface (UI) displayed by the first client. The user interface displays an operation screen of the multiplayer online battle program. The multiplayer online battle program provides a virtual environment in which at least two teams of virtual characters conduct an online battle. The virtual environment is a battle situation environment used for at least two teams of virtual characters to battle. The multiplayer online battle program may be any one of a military simulation program, a MOBA game, an escape shooting game, or an SLG. In this embodiment, an example in which the first client is a MOBA game is used for description.

Figure 7:
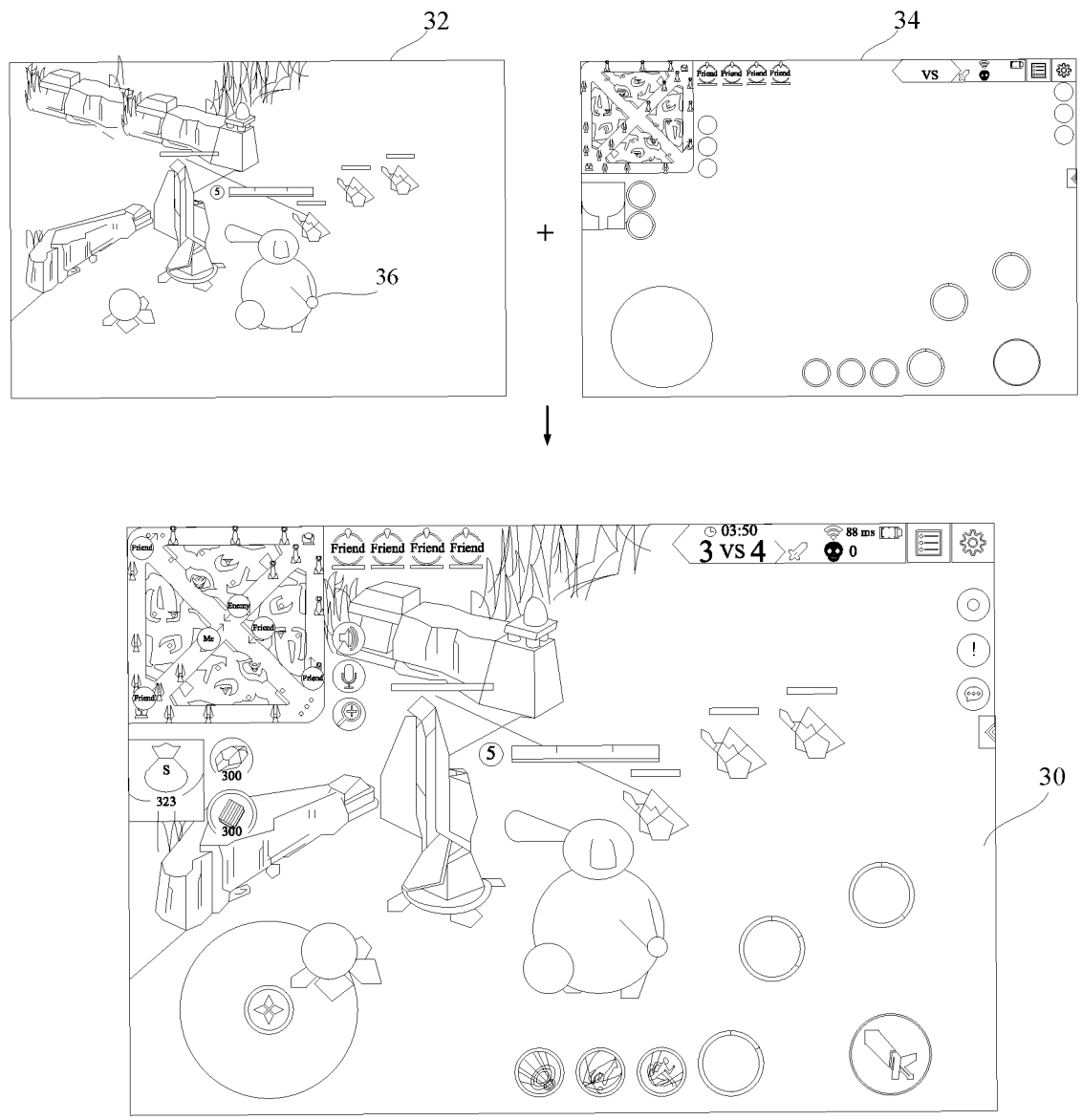
FIG. 7 is a schematic diagram of an interface of a method for transmitting a message in a multiplayer online battle program provided in the embodiment of FIG. 5 when being performed.

Exemplarily, the user interface 30 of the multiplayer online battle program includes a virtual environment screen 32 and an interaction panel region 34, as shown in FIG. 7. In some embodiments, the interaction panel region 34 is superimposed on an upper layer of the virtual environment screen 32.

The virtual environment screen 32 is a screen generated by observing the virtual environment from a perspective corresponding to the first virtual character 36. The first virtual character is a virtual character controlled by a user using the first client in the virtual environment. The perspective corresponding to the first virtual character may be any one of a first-person perspective, a 45° oblique top-down perspective, a third-person perspective, or an over-shoulder perspective of the first virtual character. The 45° oblique top-down perspective is used as an example for description in this embodiment.

When the first virtual character 36 moves or rotates, the virtual environment screen changes at any time. The first virtual character 36 may appear in the virtual environment screen or may not appear in the virtual environment screen.

The interaction panel region 34 is a user interface element superimposed on the virtual environment screen 32. The interaction panel region 34 is divided into two types: information display elements used for displaying information and control function elements used for man-computer interaction. The interaction panel region 34 is also referred to as a head up display (HUD) region.

Figure 8:
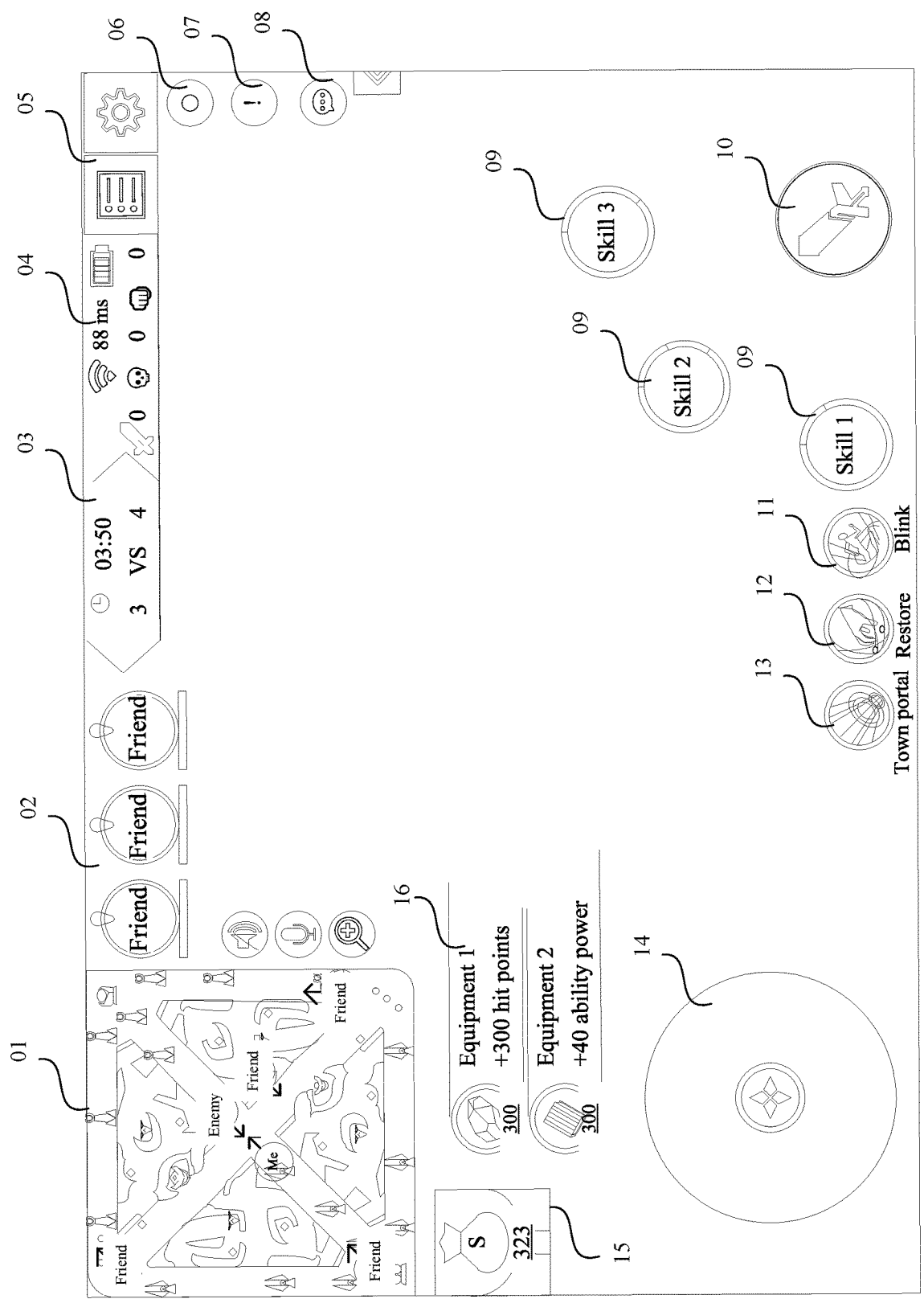
FIG. 8 is a schematic diagram of an interface of a head up display (HUD) region according to an embodiment of this application.

For example, as shown in FIG. 8, the HUD region 34 includes: a minimap region 01, a friend information region 02, a scoreboard 03, a device information region and master virtual character score region 04, a menu region 05, a minimap region extension button 06, a button control 07, a chatting control 08, a skill button 09 of the master virtual character, an attack skill button 10 of the master virtual character, a summoner skill 11, a restore skill 12, a recall skill 13, a moving control 14, a gold coin region 15, and recommended equipment 16.

The friend information region 02, the scoreboard 03, and the device information region and master virtual character score region 04 are the information display elements, and the other elements are the control function elements. The interaction panel region 34 may include other elements, such as a death panel, a turret-attacking button, and a creep-attacking button. This is not limited in this embodiment.

After a user starts a round of battle, the first user interface of the multiplayer online battle program is displayed.

Step 440: Display a warning transmitting control in a predetermined region on the first user interface in response to that an event associated with a virtual character in the virtual environment satisfies a warning condition.

The warning transmitting control is configured to transmit a warning message corresponding to the event satisfying the warning condition. In some embodiments, warning messages corresponding to at least two events are different. That is, the warning transmitting control may be configured to transmit two different warning messages.

In some embodiments, the warning condition be divided into an enemy warning condition and a friend warning condition. The enemy warning condition is used for indicating dynamic information of the enemy virtual character. The friend warning condition is used for reporting dynamic information of the first virtual character to the friend.

The enemy warning condition includes at least one of the following conditions: a disappearance time of the enemy virtual character in a specified time period reaches a first time threshold; an appearance time of the enemy virtual character in a specified map region reaches a second time threshold; a character level of the enemy virtual character reaches a level threshold; the enemy virtual character casts a specified skill, and there is a friend virtual character in a damage threshold range of the specified skill; or a hidden location of the enemy virtual character is found.

In some embodiments, the enemy warning condition further includes at least one of the following conditions: the first virtual character and the enemy virtual character are located in a same branch; the first virtual character is nearest to the enemy virtual character distance; the first virtual character is a virtual character with the highest economic value in friend virtual characters; or the first virtual character finds the hidden location of the enemy virtual character.

In some embodiments, the enemy warning condition may further include: more than one enemy virtual character simultaneously attacks the first virtual character, more than one enemy virtual character simultaneously attacks an ally turret, and so on.

The friend warning condition includes at least one of the following conditions: a combat power of the first virtual character is lower than a combat power threshold; or hit points of the first virtual character are lower than a hit point threshold. In addition, the friend warning condition may further include: the first virtual character does not have Ultimate Move, the mana of the first virtual character is lower than a mana threshold, and the like.

Exemplarily, the following warning conditions are set in a MOBA game: Within the first 4 minutes of the game, a disappearance time of the enemy virtual character located in a same branch as the first virtual character reaches a first time threshold of 3 seconds. After the first 10 minutes of the game, the disappearance time of the enemy virtual character reaches the first time threshold of 10 seconds, and the first virtual character is an ally virtual character with the highest economic value. The appearance time of the enemy virtual character on the map reaches a second time threshold of 3 seconds, and the first virtual character is an ally virtual character nearest to the enemy virtual character. A character level of the enemy virtual character reaches a level threshold of a level 4, and the first virtual character is an ally virtual character nearest to the enemy virtual character that reaches the level 4. The enemy virtual character casts a summoner skill, there is a friend virtual character within a damage threshold range of 2000 mm of the summoner skill, and the first virtual character is an ally virtual character nearest to the enemy virtual character that casts the summoner skill. The summoner skill includes at least one of the following: Blink, Weak, Cleanse, Stun, Heal, Sprint, Rage, Execute, Retribution, or Interference. The enemy virtual character casts an Ultimate Move skill, there is a friend virtual character within a damage threshold range of 2000 mm of the Ultimate Move skill, and the first virtual character is an ally virtual character nearest to the enemy virtual character that casts the Ultimate Move skill. A hidden location of the enemy virtual character is hit by casting a skill. A combat power of the first virtual character is lower than a combat power threshold of 10%. Hit points of the first virtual character are lower than a hit point threshold of 10%. All threshold, specified map regions, and specified time periods in the warning conditions can be set according to an actual situation. The threshold, specified map regions, and specified time periods involved in the warning conditions are not limited in this application.

A warning transmitting control is displayed in a predetermined region on the first user interface in response to that an event associated with an enemy virtual character in the virtual environment satisfies a warning condition; and/or the warning transmitting control is displayed in the predetermined region on the first user interface in response to that an event associated with the first virtual character in the virtual environment satisfies a friend warning condition.

In some embodiments, a warning transmitting control corresponding to an event that satisfies an enemy warning condition and a warning transmitting control corresponding to an event that satisfies a friend warning condition are the same warning transmitting control or two different warning transmitting controls.

An icon corresponding to the enemy warning condition or the friend warning condition is displayed on the warning transmitting control. Correspondences between warning conditions and icons displayed on the warning transmitting control are shown by FIGS. 9A through 9C depict three tables showing respective correspondences between warning information of an enemy virtual character, a specific warning condition associated with the enemy virtual character, a display occasion of a warning transmitting control, a presentation form (e.g., an icon) of the warning transmitting control, and a presentation form (e.g., an icon) of a warning message in a method for transmitting a message in a multiplayer online battle program according to an embodiment of this application. The fourth column from the left in FIGS. 9A, 9B and 9C lists various presentation forms of the warning transmitting control.

A region in which the warning transmitting control is displayed is a preset fixed region, that is, a predetermined region. Exemplarily, the predetermined region is based on the principle of not affecting the field of view and operations of a user while being relatively notable. For example, as shown in FIG. 1 and FIG. 2, the warning transmitting control is displayed in the upper right corner of the user interface, which neither obscure the main screen content in the user interface nor affects the operations of the user while having a location that is relatively notable and convenient to click/ tap.

In some embodiments, a quantity of warning transmitting controls displayed in the predetermined region on the first user interface may be only one, two, or any quantity. The quantity of the displayed warning transmitting controls is not limited in this application. Generally, only one warning transmitting control is displayed in the predetermined region on the first user interface, to avoid a plurality of warning transmitting controls appearing on the user interface simultaneously or a plurality of warning messages appearing simultaneously after the plurality of warning transmitting controls are triggered from affecting the field of view of the user or affecting normal operations of the user in the game, resulting in a poor user experience.

Exemplarily, when events generated by the virtual character in the virtual environment in a short time satisfies a plurality of warning conditions, a plurality of warning transmitting controls are simultaneously displayed in the predetermined region on the first user interface, and the warning transmitting controls and the events that satisfies the warning conditions have one-to-one correspondences. Alternatively, only one warning transmitting control is displayed in the predetermined region on the first user interface, and the warning transmitting control corresponds to the latest event that satisfies the warning condition. Alternatively, two warning transmitting controls may be displayed simultaneously in the predetermined region on the first user interface. For example, a warning transmitting control is configured to transmit a warning message corresponding to the latest event that satisfies the enemy warning condition, and the other warning transmitting control is configured to transmit a warning message corresponding to the latest event that satisfies the friend warning condition.

Step 460: Transmit the warning message to a second terminal in response to a transmitting operation triggered on the warning transmitting control.

When a user using the first account chooses to transmit a warning message, the warning message is transmitted to the second terminal. The second terminal logs into the multiplayer online battle program (that is, the second client) using the second account. The first virtual character controlled by the first account and the second virtual character controlled by the second account have a teammate relationship.

After the second client receives the warning message, the warning message is displayed on a second user interface.

In some embodiments, message content of the warning message includes at least one of the following: an avatar of the first account, an icon corresponding to a type to which a warning condition belongs, or a text corresponding to the warning condition.

Exemplarily, the warning message transmitted by the first client is used for indicating that an enemy virtual character located in a same branch disappears, and a warning condition is that within the first 4 minutes of the game, a time during which the enemy virtual character located in the same branch as the first virtual character disappears from the field of view of an ally exceeds 3 seconds. The icon corresponding to the type to which the warning condition belongs is set to a question mark, and the text corresponding to the warning condition is "Enemy disappears". A form of the warning message finally presented on the user interface is the avatar of the first account, the question mark icon, and the text "Enemy disappears". For details of presentation forms of different warning messages, reference may be made to the rightmost column of FIGS. 9A-through 9C, and details are not described herein again.

In some embodiments, after the first client transmits the warning message, the warning message is also displayed on the first user interface.

Exemplarily, after the first client transmits the warning message to the second client, a warning message the same as that on the second user interface is displayed on the first user interface. The warning message includes at least one of the following: an avatar of the first account, an icon corresponding to a type to which a warning condition belongs, or a text corresponding to the warning condition.

In some embodiments, displaying the warning transmitting control on the first user interface is canceled when a display duration of the warning transmitting control reaches a third time threshold, and no trigger operation on the warning transmitting control is received.

Exemplarily, the third time threshold is preset to 3 seconds. The warning transmitting control automatically disappears from the first user interface when a time during which the warning transmitting control is displayed on the first user interface reaches 3 seconds, and no trigger operation on the warning transmitting control is received. A specific value of the third time threshold may be set to, for example, 2 seconds, 3 seconds, or 5 seconds, by oneself according to an actual situation. The value of the third time threshold is not limited in this application.

Exemplarily, the first client transmits a frame synchronization signal to the server, the frame synchronization signal carrying the warning message. The server transmits the frame synchronization signal to the second client corresponding to the second virtual character (optionally including the first virtual character). The second client displays or plays the warning message according to the frame synchronization signal.

In conclusion, in the method provided by this embodiment, when an event associated with a virtual character satisfies a warning condition, a warning transmitting control is automatically generated on a first user interface, a user can transmit a warning message related to an enemy virtual character or a virtual character controlled by the user by only selecting the warning transmitting control, so that a friend can quickly learn of warning information. An efficient method for transmitting a message in a multiplayer online battle program is provided, thereby saving the time spent by the user in performing click/tap operations and typing operations many times and improving the efficiency of human-machine interaction.

Figure 10:
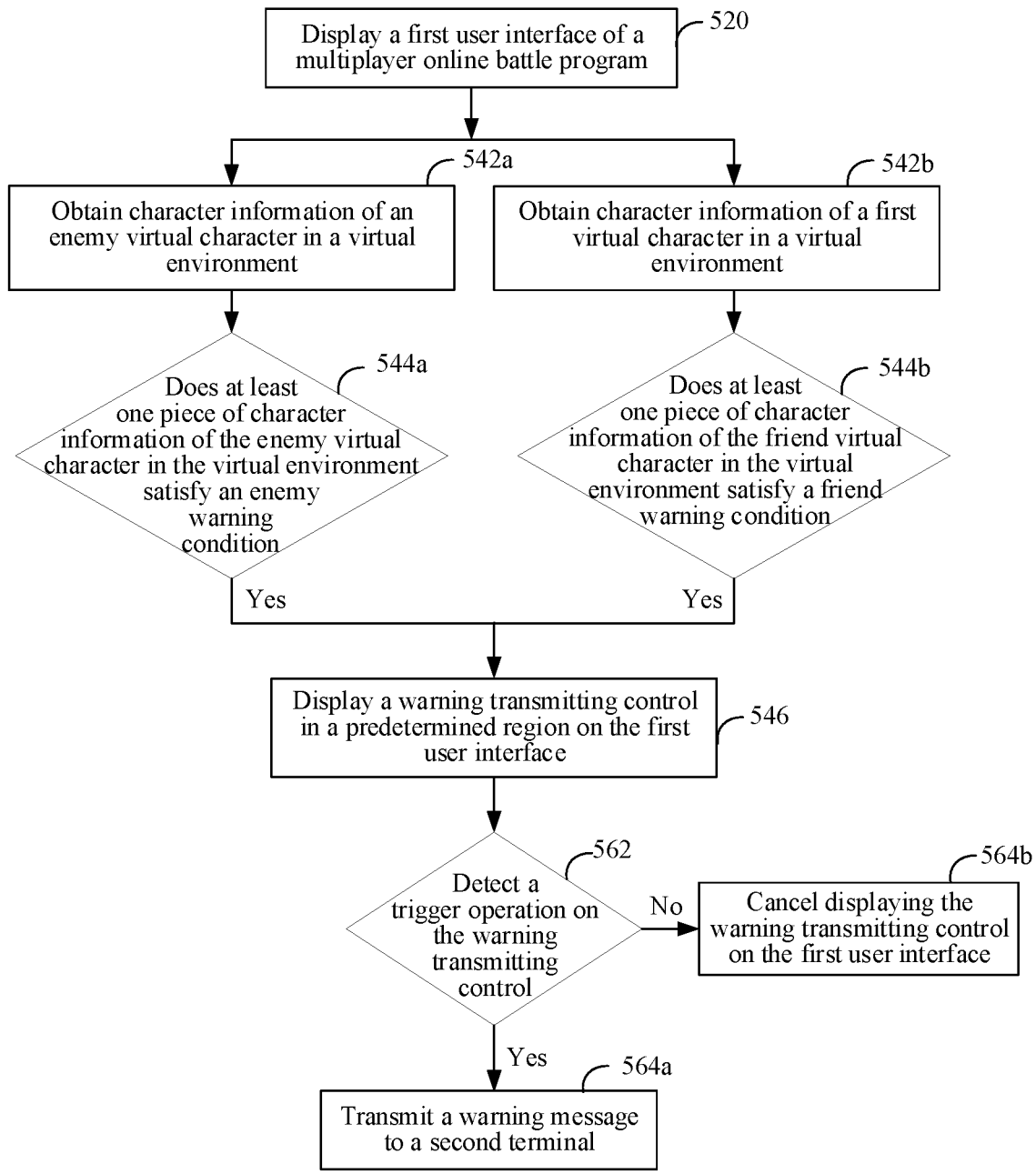
FIG. 10 is a flowchart of a method for transmitting a message in a multiplayer online battle program according to an embodiment of this application.

FIG. 10 is a flowchart of a method for transmitting a message in a multiplayer online battle program according to an exemplary embodiment of this application. The method may be performed by any terminal in FIG. 3, for example, be performed by the first terminal. The first terminal logs into a multiplayer online battle program (that is, the first client) using the first account. The method includes:

Step 520: Display a first user interface of a multiplayer online battle program.

For step 520, reference may be made to step 420, and details are not described herein.

Step 542a: Obtain character information of an enemy virtual character in a virtual environment.

The first terminal obtains character information of an enemy virtual character in a virtual environment, the character information including at least one of time information, space information, behavior information, or character attribute information.

The time information includes a game starting time, a skill cooldown time of the virtual character, and a resurrection time of the virtual character. The space information is used for indicating a location at which a virtual character is located in a virtual world. The behavior information includes skill casting information equipment purchase information, and the like of a virtual character. The character attribute information includes hit point information, combat power information, and the like of a virtual character.

In some embodiments, the first terminal simultaneously obtains character information of a first virtual character and a friend virtual character thereof in a virtual environment, the character information including at least one of time information, space information, behavior information, or character attribute information.

In some embodiments, step 542a may be performed by the event node in the logic layer 222 of the first client 220 in FIG. 4.

Step 544a: Determine whether there is at least one piece of character information of the enemy virtual character in the virtual environment satisfies an enemy warning condition.

The enemy warning condition includes at least one of the following conditions: a disappearance time of the enemy virtual character in a specified time period reaches a first time threshold; an appearance time of the enemy virtual character in a specified map region reaches a second time threshold; a character level of the enemy virtual character reaches a level threshold; the enemy virtual character casts a specified skill, and there is a friend virtual character in a damage threshold range of the specified skill; or a hidden location of the enemy virtual character is found.

The enemy warning condition further includes at least one of the following conditions: the first virtual character and the enemy virtual character are located in a same branch; the first virtual character is nearest to the enemy virtual character distance; the first virtual character is a virtual character with the highest economic value in friend virtual characters; or the first virtual character finds the hidden location of the enemy virtual character.

In addition, the enemy warning condition may also include: more than one enemy virtual character simultaneously attacks the first virtual character, more than one enemy virtual character simultaneously attacks, and so on.

Exemplarily, the enemy warning condition may be any one of the foregoing enemy warning conditions. Alternatively, the enemy warning condition is a combined condition of the foregoing enemy warning conditions. The setting of the enemy warning condition is not limited in this application.

The first terminal determines whether there is at least one piece of character information of the enemy virtual character in the virtual environment satisfies an enemy warning condition. Exemplarily, when at least one piece of character information in the obtained character information of the enemy virtual character satisfies an enemy warning condition, it is considered that a determining condition is satisfied, and step 546 is performed. Alternatively, when a combination of a plurality of pieces of character information in the obtained character information of the enemy character satisfies an enemy warning condition, it is considered that the determining condition is satisfied, and step 546 is performed. Alternatively, when a combination of at least one piece in the obtained character information of the enemy virtual character and at least one in the character information of the first virtual character and the friend virtual character thereof satisfies an enemy warning condition, it is considered that the determining condition is satisfied, and step 546 is performed.

In some embodiments, step 544a may be performed by the logic node in the logic layer 222 of the first client 220 in FIG. 4.

In some embodiments, when in step 544a, the logic node determines that the enemy warning condition is satisfied, the presentation node in the logic layer 222 of the first client 220 in FIG. 4 transmits a protocol packet 224 to the presentation layer 226. The protocol packet 224 is used for instructing the presentation layer 226 to present the satisfied warning condition.

Step 542b: Obtain character information of the first virtual character in the virtual environment.

Character information of the first virtual character in the virtual environment is obtained, the character information including at least one of time information, space information, behavior information, or character attribute information.

In some embodiments, step 542b may be performed by the event node in the logic layer 222 of the first client 220 in FIG. 4.

Step 544b: Determine whether there is at least one piece of character information of the first virtual character in the virtual environment satisfies a friend warning condition.

The friend warning condition includes at least one of the following conditions: a combat power of the first virtual character is lower than a combat power threshold; or hit points of the first virtual character are lower than a hit point threshold. In addition, the friend warning condition may further include: the first virtual character does not have Ultimate Move, the mana of the first virtual character is lower than a mana threshold, and the like.

The first terminal determines whether there is at least one piece of character information of the first virtual character in the virtual environment satisfies a friend warning condition. When at least one piece of character information of the first virtual character in the virtual environment satisfies a friend warning condition, it is considered that a determining condition is satisfied, and step 546 is performed.

In some embodiments, step 544b may be performed by the logic node in the logic layer 222 of the first client 220 in FIG. 4.

In some embodiments, when in step 544b, the logic node determines that the friend warning condition is satisfied, the presentation node in the logic layer 222 of the first client 220 in FIG. 4 transmits a protocol packet 224 to the presentation layer 226. The protocol packet 224 is used for instructing the presentation layer 226 to present the satisfied warning condition.

Step 542a and step 544a have a sequential relationship. Step 542a is performed first, and then step 544a is performed. Step 542b and step 544b have a sequential relationship. Step 542b is performed first, and then step 544b is performed. However, the sequential relationship between steps 542a and 544a and steps 542b and 544b is not limited in this application. Steps 542a and 544a may be performed first, and then, steps 542b and 544b are performed. Alternatively, steps 542b and 544b are performed first, and then, steps 542a and step 544a are performed. Alternatively, steps 542a and 544a and steps 542b and 544b are performed simultaneously.

Step 546: Display a warning transmitting control in a predetermined region on the first user interface.

A warning transmitting control is displayed in a predetermined region on the first user interface in response to that an event associated with an enemy virtual character in the virtual environment satisfies a warning condition; and/or the warning transmitting control is displayed in the predetermined region on the first user interface in response to that an event associated with the first virtual character in the virtual environment satisfies a friend warning condition.

An icon corresponding to the enemy warning condition or the friend warning condition is displayed on the warning transmitting control. Correspondences between warning conditions and icons displayed on the warning transmitting control are shown by FIG. 7. The fourth column from the left in FIG. 7 lists various presentation forms of the warning transmitting control.

In some embodiments, a quantity of warning transmitting controls displayed in the predetermined region on the first user interface may be only one, two, or any quantity. The quantity of the displayed warning transmitting controls is not limited in this application.

Exemplarily, when events generated by the virtual character in the virtual environment in a short time satisfies a plurality of warning conditions, a plurality of warning transmitting controls are simultaneously displayed in the predetermined region on the first user interface, and the warning transmitting controls and the events that satisfies the warning conditions have one-to-one correspondences. Alternatively, only one warning transmitting control is displayed in the predetermined region on the first user interface, and the warning transmitting control corresponds to the latest event that satisfies the warning condition. Alternatively, two warning transmitting controls may be displayed simultaneously in the predetermined region on the first user interface. A warning transmitting control is configured to transmit a warning message corresponding to the latest event that satisfies the enemy warning condition, and the other warning transmitting control is configured to transmit a warning message corresponding to the latest event that satisfies the friend warning condition.

Step 562: Detect whether a transmitting operation is triggered on the warning transmitting control.

Exemplarily, the user using the first account performs a transmitting operation by tapping a warning transmitting control displayed on a touchscreen of the first terminal. Alternatively, the user using the first account moves a mouse to a display location of the warning transmitting control on the first user interface, and click the left button of a mouse to perform a transmitting operation on the warning message. A manner in which the user using the first account perform a transmitting operation on the warning message is not limited in this application.

When the first terminal or the first client detects that a transmitting operation is triggered on the warning transmitting control, step 564a is performed. When a display time of the warning transmitting control on the first user interface reaches a third time threshold, and no trigger operation on the warning transmitting control is received, step 564b is performed.

A specific value of the third time threshold may be set by oneself according to an actual situation, for example, to 2 seconds, 3 seconds, or 5 seconds. The value of the third time threshold is not limited in this application.

Step 564a: Transmit a warning message to a second terminal.

When a user using the first account chooses to transmit a warning message, the warning message is sent to the second terminal. The first virtual character controlled by the first account and the second virtual character controlled by the second account have a teammate relationship. That is, the second virtual character is a friend virtual character of the first virtual character, and there may be one or more second virtual characters. In some embodiments, when a user using the first account chooses to transmit a warning message, the warning message is transmitted to a team channel of a current team. The team channel includes the second terminal.

After the second terminal, the second client, or the second account receives the warning message, the warning message is displayed on a second user interface.

In some embodiments, message content of the warning message includes at least one of the following: an avatar of the first account, an icon corresponding to a type to which a warning condition belongs, or a text corresponding to the warning condition.

Exemplarily, the warning message transmitted by the first client is used for indicating that an enemy virtual character located in a same branch disappears, and a warning condition is that within the first 4 minutes of the game, a time during which the enemy virtual character located in the same branch as the first virtual character disappears from the field of view of an ally exceeds 3 seconds. The icon corresponding to the type to which the warning condition belongs is set to a question mark, and the text corresponding to the warning condition is "Enemy disappears". A form of the warning message finally presented on the user interface is the avatar of the first account, the question mark icon, and the text "Enemy disappears". For details of presentation forms of different warning messages, reference may be made to the rightmost column of FIG. 7, and details are not described herein again.

In some embodiments, after the first terminal, the first client, or the first account transmits the warning message, the warning message is also displayed on the first user interface.

Exemplarily, after the first terminal (or the first client) transmits the warning message to the second terminal (or the second client), a warning message the same as that on the second user interface is displayed on the first user interface. The warning message includes at least one of the following: an avatar of the first account, an icon corresponding to a type to which a warning condition belongs, or a text corresponding to the warning condition.

Exemplarily, the first client transmits a frame synchronization signal to the server. The frame synchronization signal carries the warning message. The server transmits the frame synchronization signal to the second client corresponding to the second virtual character (optionally including the first virtual character). The second client displays or plays the warning message according to the frame synchronization signal.

Step 564b: Cancel displaying the warning transmitting control on the first user interface.

Displaying the warning transmitting control on the first user interface is canceled when a display duration of the warning transmitting control in the predetermined region on the first user interface reaches a third time threshold, and no trigger operation on the warning transmitting control is received.

Exemplarily, the third time threshold is set to 3 seconds. The warning transmitting control automatically disappears from the first user interface when a display time of the warning transmitting control on the first user interface reaches 3 seconds, and the user using the first account does not choose to transmit a warning message. A value of the third time threshold may be set to 2 seconds, 3 seconds, 5 seconds, or the like according to an actual situation. The value of the third time threshold is not limited in this application.

In conclusion, in the method provided in this embodiment of this application, whether there is a case of satisfying a warning condition is determined by obtaining virtual character information in a virtual environment. When the virtual character information alone or in combination satisfies a warning condition, the warning transmitting control is displayed on the first user interface. The user can quickly report a warning message to a teammate by choosing to transmit the warning message, so that the teammate can respond quickly. A convenient and efficient method for transmitting a message in a multiplayer online battle program is provided, so that a user can sends a warning message to a teammate using one key in an application program that requires quick responses, thereby improving the efficiency of human-machine interaction.

Figure 11:
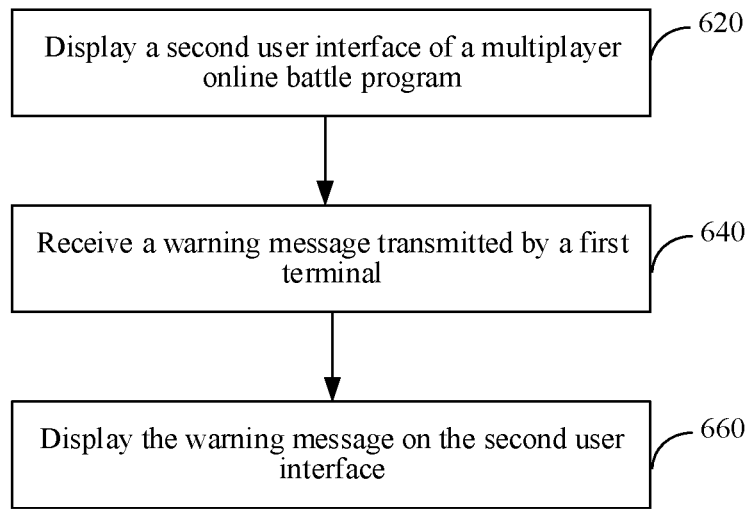
FIG. 11 is a flowchart of a method for receiving a message in a multiplayer online battle program according to an embodiment of this application.

FIG. 11 is a flowchart of a method for receiving a message in a multiplayer online battle program according to an exemplary embodiment of this application. The method may be performed by any terminal in FIG. 3, for example, be performed by the second terminal. The second terminal logs into a multiplayer online battle program (that is, the second client) using the second account. The method includes:

Step 620: Display a second user interface of a multiplayer online battle program.

The second user interface is a user interface displayed by the second client. The user interface displays the multiplayer online battle program.

The method of displaying the second user interface of the multiplayer online battle program is similar to the method of displaying the first user interface of the multiplayer online battle program in step 420. The difference is that the first user interface displays a screen generated when the virtual environment is observed from a perspective corresponding to the first virtual character, while the second user interface displays a screen generated when the virtual environment is observed from a perspective corresponding to the second virtual character. Details are not described herein again.

Step 640: Receive a warning message transmitted by a first terminal.

The warning message is transmitted when an event associated with a virtual character of a first terminal in the virtual environment satisfies a warning condition and a warning transmitting control corresponding to the event is triggered. The first terminal logs into the multiplayer online battle program using the first account. The first virtual character controlled by the first account and the second virtual character controlled by the second account have a teammate relationship. For a process in which the first account transmits the warning message, reference may be made to the foregoing embodiment.

Exemplarily, the warning message is transmitted when an enemy virtual character of the first account in the virtual environment generates an event satisfying an enemy warning condition. Alternatively, the warning message is transmitted when a first virtual character of the first account in the virtual environment generates an event satisfying a friend warning condition, the first virtual character being a virtual character controlled by the first account.

The enemy warning condition includes at least one of the following conditions: a disappearance time of the enemy virtual character in a specified time period reaches a first time threshold; an appearance time of the enemy virtual character in a specified map region reaches a second time threshold; a character level of the enemy virtual character reaches a level threshold; the enemy virtual character casts a specified skill, and there is a friend virtual character in a damage threshold range of the specified skill; or a hidden location of the enemy virtual character is found.

The enemy warning condition may further include at least one of the following conditions: the first virtual character and the enemy virtual character are located in a same branch; the first virtual character is nearest to the enemy virtual character distance; the first virtual character is a virtual character with the highest economic value in friend virtual characters; or the first virtual character finds the hidden location of the enemy virtual character.

The friend warning condition includes at least one of the following conditions: a combat power of the first virtual character is lower than a combat power threshold; or hit points of the first virtual character are lower than a hit point threshold.

Exemplarily, the first client transmits a frame synchronization signal to the server. The frame synchronization signal carries the warning message. The server transmits the frame synchronization signal to the second client corresponding to the second virtual character (optionally including the first virtual character). The second client receives the frame synchronization signal transmitted by the first client, the frame synchronization signal carrying the warning message.

Step 660: Display the warning message on the second user interface.

Message content of the warning message includes at least one of the following: an avatar of the first account, an icon corresponding to a type to which a warning condition belongs, or a text corresponding to the warning condition.

Exemplarily, the warning message received by the second client indicates that an enemy virtual character A casts a summoner skill, Heal, and there is a friend virtual character within a range of 2000 mm when the enemy virtual character A casts the summoner skill, Heal. The icon corresponding to the type to which the warning condition belongs is an avatar of the enemy virtual character A, and the text corresponding to the warning condition is "No Heal". Therefore, the warning message is disposed on the second user interface. The content of the warning message includes: the avatar of the first account, the avatar of the enemy virtual character A, and the text "No Heal".

In conclusion, in the method provided in this embodiment, a warning message transmitted when a virtual character of the first account in the virtual environment generates an event satisfying a warning condition is received, and the warning information is displayed on the second user interface, thereby providing an efficient method of receiving a message in a multiplayer online battle program. The warning message can be automatically generated and pushed to the first account according to virtual character information without being selected or entered by the first account manually. The first account can share the warning message with the second account by choosing to transmit the warning message using one key, thereby improving the efficiency of communication in a team in the multiplayer online battle program.

Figure 12:
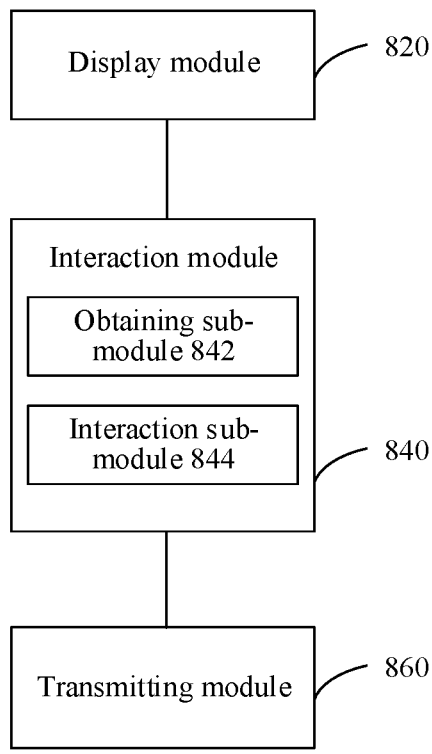
FIG. 12 is a schematic diagram of an apparatus for transmitting a message in a multiplayer online battle program according to an embodiment of this application.

FIG. 12 is a schematic diagram of an apparatus for transmitting a message in a multiplayer online battle program according to an exemplary embodiment of this application. The apparatus logs into a multiplayer online battle program using a first account. The apparatus includes:

a display module 820, configured to display a first user interface of the multiplayer online battle program, the multiplayer online battle program providing a virtual environment for at least two teams of virtual characters to conduct an online battle;

an interaction module 840, configured to display a warning transmitting control in a predetermined region on the first user interface in response to that an event associated with a virtual character in the virtual environment satisfies a warning condition, the warning transmitting control being configured to transmit a warning message corresponding to the event; and a transmitting module 860, configured to transmit the warning message to a second terminal in response to a transmitting operation triggered on the warning transmitting control, the second terminal logging into the multiplayer online battle program using a second account, and the first account and the second account having a teammate relationship.

In some embodiments, the interaction module 840 is configured to display the warning transmitting control in the predetermined region on the first user interface in response to that an enemy virtual character in the virtual environment generates an event satisfying an enemy warning condition; and/or the interaction module 840 is configured to display the warning transmitting control in the predetermined region on the first user interface in response to that the first virtual character in the virtual environment generates an event satisfying a friend warning condition.

In some embodiments, the interaction module 840 includes an obtaining sub-module 842 and an interaction sub-module 844. The obtaining sub-module 842 is configured to obtain character information of the enemy virtual character in the virtual environment, the character information including at least one of time information, space information, behavior information, or character attribute information. The interaction sub-module 844 is configured to display the warning transmitting control in the predetermined region on the first user interface in response to that at least one piece of character information of the enemy virtual character in the virtual environment satisfies the enemy warning condition.

In some embodiments, the enemy warning condition includes at least one of the following conditions: a disappearance time of the enemy virtual character in a specified time period reaches a first time threshold; an appearance time of the enemy virtual character in a specified map region reaches a second time threshold; a character level of the enemy virtual character reaches a level threshold; the enemy virtual character casts a specified skill, and there is a friend virtual character in a damage threshold range of the specified skill; or a hidden location of the enemy virtual character is found.

In some embodiments, the enemy warning condition further includes at least one of the following conditions: the first virtual character and the enemy virtual character are located in a same branch; the first virtual character is nearest to the enemy virtual character distance; the first virtual character is a virtual character with the highest economic value in friend virtual characters; or the first virtual character finds the hidden location of the enemy virtual character.

In some embodiments, the interaction module 840 includes an obtaining sub-module 842 and an interaction sub-module 844. The obtaining sub-module 842 is configured to obtain character information of the first virtual character in the virtual environment, the character information including at least one of time information, space information, behavior information, or character attribute information. The interaction sub-module 844 is configured to display the warning transmitting control in the predetermined region on the first user interface in response to that at least one piece of character information of the first virtual character in the virtual environment satisfies the friend warning condition.

In some embodiments, the friend warning condition includes at least one of the following conditions: a combat power of the first virtual character is lower than a combat power threshold; or hit points of the first virtual character are lower than a hit point threshold.

In some embodiments, the interaction module 840 is configured to display an icon corresponding to the enemy warning condition or the friend warning condition on the warning transmitting control.

In some embodiments, the display module 820 is configured to display the warning message on the first user interface.

In some embodiments, message content of the warning message includes at least one of the following: an avatar of the first account, an icon corresponding a type to which the warning condition belongs, or a text corresponding to the warning condition.

In some embodiments, the interaction module 840 is configured to cancel displaying the warning transmitting control on the first user interface when a display duration of the warning transmitting control reaches a third time threshold, and no trigger operation on the warning transmitting control is received.

Figure 13:
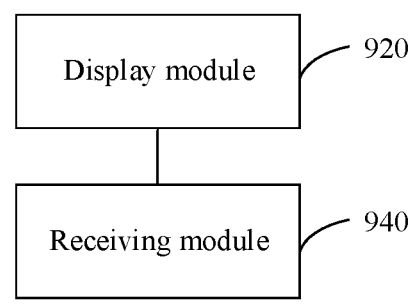
FIG. 13 is a schematic diagram of an apparatus for receiving a message in a multiplayer online battle program according to an embodiment of this application.

FIG. 13 is a schematic diagram of an apparatus for receiving a message in a multiplayer online battle program according to an exemplary embodiment of this application. The apparatus logs into a multiplayer online battle program using a second account. The apparatus includes:

a display module 920, configured to display a second user interface of the multiplayer online battle program, the multiplayer online battle program providing a virtual environment for at least two teams of virtual characters to conduct an online battle; and a receiving module 940, configured to receive a warning message, the warning message being transmitted when a virtual character of a first terminal in the virtual environment generates an event satisfying a warning condition and a warning transmitting control corresponding to the event is triggered, the first terminal logging into the multiplayer online battle program using a first account, and the first account and the second account having a teammate relationship, the display module 920 being further configured to display the warning message on the second user interface.

In some embodiments, the warning message being transmitted when an enemy virtual character of the first terminal in the virtual environment generates an event satisfying an enemy warning condition and a warning transmitting control corresponding to the event is triggered; and/or the warning message being transmitted when a first virtual character of the first terminal in the virtual environment generates an event satisfying a friend warning condition and a warning transmitting control corresponding to the event is triggered, the first virtual character being a virtual character controlled by the first account.

In some embodiments, the enemy warning condition includes at least one of the following conditions: a disappearance time of the enemy virtual character in a specified time period reaches a first time threshold; an appearance time of the enemy virtual character in a specified map region reaches a second time threshold; a character level of the enemy virtual character reaches a level threshold; the enemy virtual character casts a specified skill, and there is a friend virtual character in a damage threshold range of the specified skill; or a hidden location of the enemy virtual character is found.

In some embodiments, the enemy warning condition further includes at least one of the following conditions: the first virtual character and the enemy virtual character are located in a same branch; the first virtual character is nearest to the enemy virtual character distance; the first virtual character is a virtual character with the highest economic value in friend virtual characters; or the first virtual character finds the hidden location of the enemy virtual character.

In some embodiments, the friend warning condition includes at least one of the following conditions: a combat power of the first virtual character is lower than a combat power threshold; or hit points of the first virtual character are lower than a hit point threshold.

In some embodiments, message content of the warning message includes at least one of the following: an avatar of the first account, an icon corresponding a type to which the warning condition belongs, or a text corresponding to the warning condition.

Figure 14:
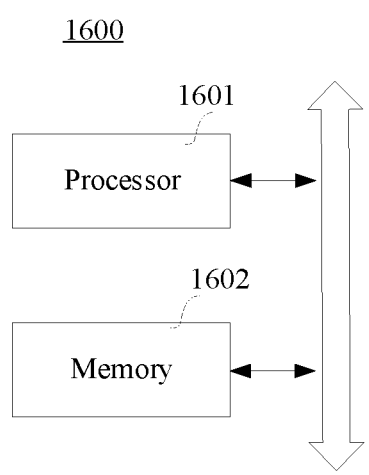
FIG. 14 is a schematic structural diagram of a terminal according to an embodiment of this application.

FIG. 14 is a schematic structural diagram of a terminal for transmitting a message in a multiplayer online battle program or a terminal for receiving a message in a multiplayer online battle program according to an exemplary embodiment of this application. The terminal 1600 may be a portable mobile terminal, for example, a smartphone, a tablet computer, a moving screen experts group audio layer III (MP3) player, or a moving screen experts group audio layer IV (MP4) player. The terminal 1600 may also be referred to as another name such as user equipment or portable terminal.

Generally, the terminal 1600 includes a processor 1601 and a memory 1602.

The processor 1601 may include one or more processing cores, for example, a 4-core processor or an 8-core processor. The processor 1601 may be implemented in at least one hardware form of a digital signal processor (DSP), a field-programmable gate array (FPGA), and a programmable logic array (PLA). The processor 1601 may also include a main processor and a coprocessor. The main processor is a processor configured to process data in an awake state, and is also referred to as a central processing unit (CPU). The coprocessor is a low power consumption processor configured to process the data in a standby state. In some embodiments, the processor 1601 may be integrated with a graphics processing unit (GPU). The GPU is configured to render and draw content that needs to be displayed on a display screen. In some embodiments, the processor 1601 may further include an artificial intelligence (AI) processor. The AI processor is configured to process computing operations related to machine learning.

The memory 1602 may include one or more computer-readable storage media. The computer-readable storage medium may be tangible and non-transient. The memory 1602 may further include a high-speed random access memory and a nonvolatile memory, for example, one or more disk storage devices or flash storage devices. In some embodiments, the non-transitory computer-readable storage medium in the memory 1602 is configured to store at least one instruction, and the at least one instruction being configured to be executed by the processor 1601 to implement the method for transmitting a message in a multiplayer online battle program or the method for receiving a message in a multiplayer online battle program provided in this application.

A person skilled in the art may understand that a structure shown in FIG. 14 constitutes no limitation on the electronic device 1600, and the electronic device may include more or fewer components than those shown in the figure, or some components may be combined, or a different component deployment may be used.

This application further provides a computer-readable storage medium, storing at least one instruction, at least one program, a code set, or an instruction set, the at least one instruction, the at least one program, the code set, or the instruction set being loaded and executed by a processor to implement the method for transmitting a message in a multiplayer online battle program or the method for receiving a message in a multiplayer online battle program provided in the foregoing method embodiments.

This application further provides a computer program product, storing at least one instruction, at least one program, a code set, or an instruction set, the at least one instruction, the at least one program, the code set, or the instruction set being loaded and executed by a processor to implement the method for transmitting a message in a multiplayer online battle program or the method for receiving a message in a multiplayer online battle program provided in the foregoing method embodiments.

In this application, the term "unit" or "module" refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

What is claimed is:

1. A method for transmitting a message in a multiplayer game performed by a first terminal, the first terminal logging into the multiplayer game using a first account, and the method comprising:
displaying a first user interface of the multiplayer game, the multiplayer game providing a virtual environment for at least two teams of virtual characters to conduct an online battle;
displaying a warning transmitting control icon in a predetermined region on the first user interface in response to that an event associated with a virtual character in the virtual environment satisfies a warning condition, the warning transmitting control icon being customized according to the event and configured to transmit a warning message corresponding to the event;
transmitting the warning message to a second terminal in response to a transmitting operation triggered on the warning transmitting control icon, the second terminal logging into the multiplayer game using a second account, and the first account and the second account having a teammate relationship; and displaying the warning message on the first user interface and removing the warning transmitting control icon from the first user interface.

2. The method according to claim 1, wherein the displaying a warning transmitting control icon in a predetermined region on the first user interface in response to that an event associated with a virtual character in the virtual environment satisfies a warning condition comprises:
displaying the warning transmitting control icon in the predetermined region on the first user interface in response to that an event associated with an enemy virtual character in the virtual environment satisfies an enemy warning condition, the enemy virtual character belonging to a team different from that of a first virtual character associated with the first account; or
displaying the warning transmitting control icon in the predetermined region on the first user interface in response to that an event associated with the first virtual character in the virtual environment satisfies a friend warning condition.

3. The method according to claim 2, wherein the displaying the warning transmitting control icon in the predetermined region on the first user interface in response to that an event associated with an enemy virtual character in the virtual environment satisfies an enemy warning condition comprises:
obtaining character information of the enemy virtual character in the virtual environment, the character information comprising at least one of time information, space information, behavior information, or character attribute information; and
displaying the warning transmitting control icon in the predetermined region on the first user interface in response to that at least one piece of character information of the enemy virtual character in the virtual environment satisfies the enemy warning condition.

4. The method according to claim 3, wherein the enemy warning condition comprises at least one of the following conditions:
a disappearance time of the enemy virtual character in a specified time period reaches a first time threshold;
an appearance time of the enemy virtual character in a specified map region reaches a second time threshold;
a character level of the enemy virtual character reaches a level threshold;
the enemy virtual character casts a specified skill, and there is a friend virtual character in a damage threshold range of the specified skill; or
a hidden location of the enemy virtual character is found.

5. The method according to claim 4, wherein the enemy warning condition further comprises at least one of the following conditions:
the first virtual character and the enemy virtual character are located in a same branch;
the first virtual character is nearest to the enemy virtual character distance;
the first virtual character is a virtual character with the highest economic value in friend virtual characters; or
the first virtual character finds the hidden location of the enemy virtual character.

6. The method according to claim 2, wherein the displaying the warning transmitting control icon in the predetermined region on the first user interface in response to that an event associated with the first virtual character in the virtual environment satisfies a friend warning condition comprises:
obtaining character information of the first virtual character in the virtual environment, the character information comprising at least one of time information, space information, behavior information, or character attribute information; and
displaying the warning transmitting control icon in the predetermined region on the first user interface in response to that at least one piece of character information of the first virtual character in the virtual environment satisfies the friend warning condition.

7. The method according to claim 6, wherein the friend warning condition comprises at least one of the following conditions:
a combat power of the first virtual character is lower than a combat power threshold; or
hit points of the first virtual character are lower than a hit point threshold.

8. The method according to claim 2, wherein:
the warning transmitting control icon corresponding to the enemy warning condition is visually different from the warning transmitting control icon corresponding to the friend warning condition.

9. The method according to claim 1, wherein message content of the warning message comprises at least one of the following:
an avatar of the first account;
an icon corresponding a type to which the warning condition belongs; or
a text corresponding to the warning condition.

10. The method according to claim 1, wherein the method further comprises:
removing the warning transmitting control icon from the first user interface when a display duration of the warning transmitting control icon reaches a third time threshold, and no trigger operation on the warning transmitting control icon is received.

11. A terminal, comprising a processor and a memory, the memory storing at least one instruction, at least one program, a code set, or an instruction set, and the at least one instruction, the at least one program, the code set, or the instruction set being loaded and executed by the processor and causing the terminal to perform a method for transmitting a message in a multiplayer game, the terminal logging into the multiplayer game using a first account, and the method comprising:
displaying a first user interface of the multiplayer game, the multiplayer game providing a virtual environment for at least two teams of virtual characters to conduct an online battle;
displaying a warning transmitting control icon in a predetermined region on the first user interface in response to that an event associated with a virtual character in the virtual environment satisfies a warning condition, the warning transmitting control icon being customized according to the event and configured to transmit a warning message corresponding to the event;
transmitting the warning message to a second terminal in response to a transmitting operation triggered on the warning transmitting control icon, the second terminal logging into the multiplayer game using a second account, and the first account and the second account having a teammate relationship; and
displaying the warning message on the first user interface and removing the warning transmitting control icon from the first user interface.

12. The terminal according to claim 11, wherein the displaying a warning transmitting control icon in a predetermined region on the first user interface in response to that an event associated with a virtual character in the virtual environment satisfies a warning condition comprises:
displaying the warning transmitting control icon in the predetermined region on the first user interface in response to that an event associated with an enemy virtual character in the virtual environment satisfies an enemy warning condition, the enemy virtual character belonging to a team different from that of a first virtual character associated with the first account; or
displaying the warning transmitting control icon in the predetermined region on the first user interface in response to that an event associated with the first virtual character in the virtual environment satisfies a friend warning condition.

13. The terminal according to claim 12, wherein the displaying the warning transmitting control icon in the predetermined region on the first user interface in response to that an event associated with an enemy virtual character in the virtual environment satisfies an enemy warning condition comprises:
obtaining character information of the enemy virtual character in the virtual environment, the character information comprising at least one of time information, space information, behavior information, or character attribute information; and
displaying the warning transmitting control icon in the predetermined region on the first user interface in response to that at least one piece of character information of the enemy virtual character in the virtual environment satisfies the enemy warning condition.

14. The terminal according to claim 13, wherein the enemy warning condition comprises at least one of the following conditions:
a disappearance time of the enemy virtual character in a specified time period reaches a first time threshold;
an appearance time of the enemy virtual character in a specified map region reaches a second time threshold;
a character level of the enemy virtual character reaches a level threshold;
the enemy virtual character casts a specified skill, and there is a friend virtual character in a damage threshold range of the specified skill; or
a hidden location of the enemy virtual character is found.

15. The terminal according to claim 14, wherein the enemy warning condition further comprises at least one of the following conditions:
the first virtual character and the enemy virtual character are located in a same branch;
the first virtual character is nearest to the enemy virtual character distance;
the first virtual character is a virtual character with the highest economic value in friend virtual characters; or
the first virtual character finds the hidden location of the enemy virtual character.

16. The terminal according to claim 12, wherein the displaying the warning transmitting control icon in the predetermined region on the first user interface in response to that an event associated with the first virtual character in the virtual environment satisfies a friend warning condition comprises:
obtaining character information of the first virtual character in the virtual environment, the character information comprising at least one of time information, space information, behavior information, or character attribute information; and
displaying the warning transmitting control icon in the predetermined region on the first user interface in response to that at least one piece of character information of the first virtual character in the virtual environment satisfies the friend warning condition.

17. The terminal according to claim 16, wherein the friend warning condition comprises at least one of the following conditions:
a combat power of the first virtual character is lower than a combat power threshold; or
hit points of the first virtual character are lower than a hit point threshold.

18. The terminal according to claim 12, wherein:
the warning transmitting control icon corresponding to the enemy warning condition is visually different from the warning transmitting control icon corresponding to the friend warning condition.

19. A non-transitory computer-readable storage medium, storing at least one instruction, at least one program, a code set, or an instruction set, the at least one instruction, the at least one program, the code set, or the instruction set being loaded and executed by a processor of a terminal and causing the terminal to perform a method for transmitting a message in a multiplayer game, the terminal logging into the multiplayer game using a first account, and the method comprising:
displaying a first user interface of the multiplayer game, the multiplayer game providing a virtual environment for at least two teams of virtual characters to conduct an online battle;
displaying a warning transmitting control icon in a predetermined region on the first user interface in response to that an event associated with a virtual character in the virtual environment satisfies a warning condition, the warning transmitting control icon being customized according to the event and configured to transmit a warning message corresponding to the event;
transmitting the warning message to a second terminal in response to a transmitting operation triggered on the warning transmitting control icon, the second terminal logging into the multiplayer game using a second account, and the first account and the second account having a teammate relationship; and
displaying the warning message on the first user interface and removing the warning transmitting control icon from the first user interface.

* * * * *